(12) United States Patent
Kim et al.

(10) Patent No.: US 8,666,930 B2
(45) Date of Patent: Mar. 4, 2014

(54) STRING MATCHING METHOD

(75) Inventors: Junghak Kim, Daejeon (KR); Song In Choi, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 700 days.

(21) Appl. No.: 12/824,600

(22) Filed: Jun. 28, 2010

(65) Prior Publication Data

US 2011/0055130 A1 Mar. 3, 2011

(30) Foreign Application Priority Data

Sep. 1, 2009 (KR) ........................ 10-2009-0082086

(51) Int. Cl.
*G06F 15/18* (2006.01)

(52) U.S. Cl.
USPC .......................................................... 706/62

(58) Field of Classification Search
USPC .......................................................... 706/62
See application file for complete search history.

(56) References Cited

U.S. PATENT DOCUMENTS

| 7,440,304 | B1 | 10/2008 | Raj |
| 2007/0115986 | A1 | 5/2007 | Shankara |
| 2008/0046423 | A1 | 2/2008 | Khan Alicherry et al. |

OTHER PUBLICATIONS

Yu et al ("Gigabit Rate Packet Pattern-Matching Using TCAM" 2004).*
Alicherry et al ("High Speed Pattern Matching for Network IDS/IPS" 2006).*
Chang et al ("Multi-Character Processor Array for Pattern Matching in Network Intrusion Detection System" 2008).*
Junghak Kim et al., "High Speed pattern Matching for Deep Packet Inspection", Proceedings of the $9^{th}$ International Symposium on Communication and Information Technology 2009 (ISCIT 2009), Sep. 29, 2009, pp. 1310-1315.
C. Jason Coit et al., "Towards Faster String Matching for Intrusion Detection or Exceeding the Speed of Snort," DARPA Information Survivability Conference & Exposition, vol. 1, IEEE 2001, pp. 367-373.

* cited by examiner

*Primary Examiner* — Lut Wong
(74) *Attorney, Agent, or Firm* — Staas & Halsey LLP

(57) ABSTRACT

A string matching device extracts a string by shifting a start position from an input data stream, compares the extracted string with a sub-string included in a target string, and when a prefix of a target string is detected from the string extracted from the input data stream, it selects one of the strings output in the next stage based on the start position of the corresponding string and uses it to detect the sub-string. Also, the device can consecutively detect at least one target string from the input data stream by using a state transition process.

22 Claims, 27 Drawing Sheets

| Memory | |
|---|---|
| Entry | Sub-string |
| 1 | ABCD |
| 2 | EFGH |
| 3 | MNS* |
| 4 | EFGH |
| 5 | MNOP |
| 6 | GHMN |
| 7 | QR** |
| ⋮ | ⋮ |

FIG. 20

Prefix processor

| Entry | Prefix |
|---|---|
| 1 | ABCD |
| 2 | EFGH |
| 3 | GHMN |
| ... | ... |

Sub-string processor

| Entry | Sub-string | State value |
|---|---|---|
| 1 | EFGH | 1 |
| 2 | MNS* | 2 |
| 3 | MNOP | 4 |
| 4 | QR** | 6 |
| 5 | MNOP | 2 |
| 6 | MNQR | 2 |
| 7 | MNQR | 4 |
| ... | ... | ... |

State transition processor 1

| Index | Next state value | String ID |
|---|---|---|
| 1 | 1 | |
| 2 | 4 | |
| 3 | 6 | |
| ... | ... | ... |

State transition processor 2

| Index | Next state value | String ID |
|---|---|---|
| 1 | 2 | |
| 2 | 3 | 1 |
| 3 | 5 | 2 |
| 4 | 7 | 3 |
| 5 | 5 | 2 |
| 6 | 7 | 3 |
| 7 | 7 | 3 |
| ... | ... | ... |

FIG. 25

| Prefix processor | |
|---|---|
| Entry | Prefix |
| 1 | ABCD |
| 2 | EFGH |
| 3 | GHMN |
| ... | ... |

| Sub-string processor | | |
|---|---|---|
| Entry | Sub-string | State value |
| 1 | EFGH | 1 |
| 2 | MNS* | P+1 |
| 3 | MNOP | 2 |
| 4 | QR** | 3 |
| 5 | MNOP | P+1 |
| 6 | MNQR | P+1 |
| 7 | MNQR | 2 |
| ... | ... | ... |

| String ID processor | |
|---|---|
| Index | String ID |
| 1 | |
| 2 | |
| 3 | |
| ... | ... |

| State transition processor | | |
|---|---|---|
| Index | Next state value | String ID |
| 1 | P+1 | |
| 2 | P+2 | 1 |
| 3 | P+3 | 2 |
| 4 | P+4 | 3 |
| 5 | P+3 | 2 |
| 6 | P+4 | 3 |
| 7 | P+4 | 3 |
| ... | ... | ... |

STRING MATCHING METHOD

CROSS-REFERENCE TO RELATED APPLICATION

This application claims priority to and the benefit of Korean Patent Application No. 10-2009-0082086 filed in the Korean Intellectual Property Office on Sep. 1, 2009, the entire contents of which are incorporated herein by reference.

BACKGROUND OF THE INVENTION (a) Field of the Invention

The present invention relates to a string matching method.

(b) Description of the Related Art

Recently, factors that threaten information security on the network have appeared in complex and various manners. Also, these threatening factors can occur in all layers of packets that are transmitted through the network.

Accordingly, network equipment and communication terminals provide various functions for sensing and intercepting such. Particularly, various types of pattern matching skills are utilized to find specific patterns relating to the threatening factors. The pattern matching skill starts by finding characters of strings that are included in the packets.

Recently, it has been possible to transmit packets at a high speed through the network due to the development of communication networks. However, the conventional string matching or pattern matching skills have difficulty in parallel processing and thus have a restriction in high-speed data processing.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a string matching method for efficiently matching strings for high-speed data streams that are transmitted through the network.

An exemplary embodiment of the present invention provides a string matching method by a string matching device including: dividing each of a plurality of target strings into at least one sub-string; extracting a plurality of strings from an input data stream; generating a third string by combining a first string and a second string before the first string from among the plurality of strings; extracting a plurality of fourth strings with different start positions from the third string; detecting the sub-string from among the fourth strings; and detecting one of the target strings based on the detected sub-string.

Another embodiment of the present invention provides a string matching method by a string matching device including: dividing each of a plurality of target strings into at least one sub-string; dividing the most significant sub-string from among the at least one sub-string as a prefix for the respective target strings; extracting a plurality of strings with different start positions from an input data stream; detecting a prefix corresponding to one of the plurality of strings from among the prefixes for the plurality of target strings; selecting a string from among the plurality of strings based on a control signal; detecting a sub-string corresponding to the selected string from among the sub-strings except the prefix; determining whether to change the control signal according to the prefix detecting result and the sub-string detecting result; and detecting one of the plurality of target strings based on the detected prefix and the detected sub-string.

Another embodiment of the present invention provides a string matching method by a string matching device including: dividing each of a plurality of target strings into at least one sub-string; dividing the prefix that is the most significant sub-string from among the at least one sub-string and other sub-strings excluding the most significant sub-string for respective target strings; setting a state value of each of the other sub-strings; setting next state values of the at least one sub-string based on the order of the at least one sub-string and the state values; extracting a plurality of strings with different start positions from an input data stream; detecting a sub-string corresponding to at least one string from among the plurality of strings based on a state variable; updating the state variable with one next state value corresponding to the detect sub-string from among the next state values of the at least one sub-string; and detecting one of the target strings based on the state variable and the detected sub-string.

BRIEF DESCRIPTION OF THE DRAWINGS

FIG. 2 shows a configuration diagram of a string according to a first exemplary embodiment of the present invention.

FIG. 7 shows an example of storing a sub-string of a target string per memory of each entry according to a second exemplary embodiment of the present invention.

FIG. 20 shows an example of data that are stored in respective constituent elements according to a fifth exemplary embodiment of the present invention.

FIG. 25 shows an example of data that are stored in respective constituent elements according to a sixth exemplary embodiment of the present invention.

DETAILED DESCRIPTION OF THE EMBODIMENTS

Figure 1:
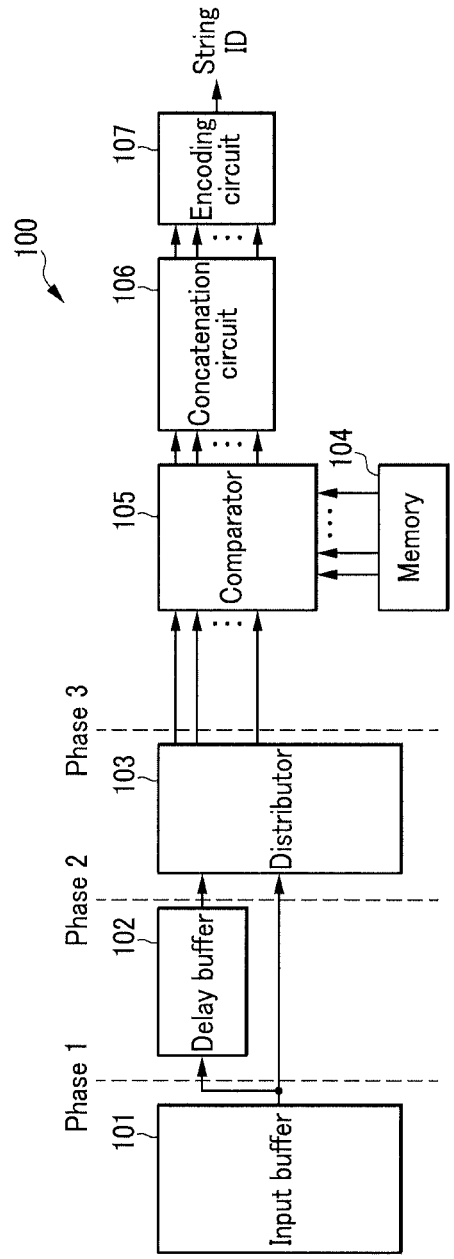
FIG. 1 shows a configuration diagram of a string matching device according to a first exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, unless explicitly described to the contrary, the word "comprise" and variations such as "comprises" or "comprising" will be understood to imply the inclusion of stated elements but not the exclusion of any other elements.

A string detecting method and device according to an exemplary embodiment of the present invention will now be described in detail with reference to accompanying drawings.

A string matching method and device according to a first exemplary embodiment of the present invention will now be described in detail with reference to FIG. 1 to FIG. 4.

Figure 2:
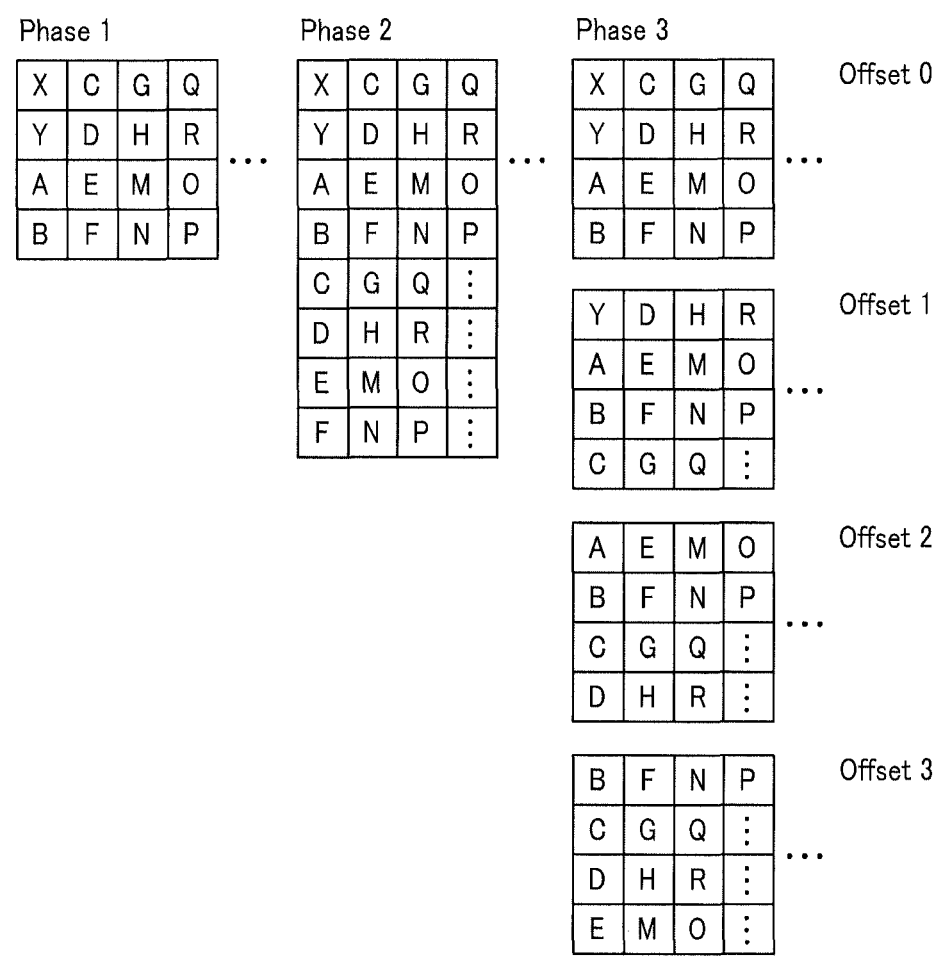

FIG. 1 shows a configuration diagram of a string matching device according to a first exemplary embodiment of the present invention, and FIG. 2 shows a configuration diagram of a string according to a first exemplary embodiment of the present invention.

Referring to FIG. 1, the string matching device 100 includes an input buffer 101, a delay buffer 102, a distributor 103, a memory 104, a comparator 105, a concatenation circuit 106, and an encoding circuit 107.

The input buffer 101 arranges an input data stream in a predetermined size to generate a string stream, and sequentially outputs a plurality of strings included in the string stream. Here, when the size of the string included in the string stream is N, the input buffer 101 generates a string stream from the input data stream, temporarily stores the same, and outputs a string with the size N for each clock signal.

Each string output by the input buffer 101 includes a plurality of characters. Therefore, when each character is expressed with C with the assumption that the size if each character is given to be 1, the string with the size N can be expressed as $C_0 C_1 \ldots C_{(N-1)}$. Here, $C_0$ represents the most significant character of the string.

The delay buffer 102 temporarily stores the string output by the input buffer 101, delays it by 1 clock signal, and outputs the delayed string. Accordingly, the string newly output by the input buffer 101 and the delayed string output by the delay buffer 102 are simultaneously input to the distributor 103.

For example, the string that is second output by the input buffer 101 is simultaneously input to the distributor 103 together with the string that is first output by the input buffer, is delayed by the delay buffer 102 by 1 clock signal, and then is output. The string output by the input buffer 101 will be referred to as the "a first string," and the string output by the delay buffer 102 will be called "a second string" hereinafter.

The distributor 103 combines the first string output by the input buffer 101 and the second string output by the delay buffer 102 by positioning the two strings on a lower part and a higher part, respectively, and thereby generates a new string. In this instance, the generated string is twice the size of the string output by the input buffer 101. That is, when the size of the first string is assumed to be N, the size of the string that is generated by combining the first string and the second string by the distributor 103 becomes 2N. The string that is generated by combining the first string and the second string by the distributor 103 will be called "the third string."

When the third string is generated, the distributor 103 extracts a plurality of strings that are positioned to be separated from the most significant character of the third string by a predetermined offset and respectively have the same size as the first string from the third string, and then outputs the plurality of strings. That is, the distributor 103 generates and outputs a plurality of strings that are included in the third string, have different start positions, and have the same size as the first string.

The string generated from the third string by the distributor 103 will be called "the fourth string."

Also, the start position of the fourth string at the third string will be called an "offset."

When the size of the third string is assumed to be 2N and each character is expressed with C, the third string can be expressed as $C_0 C_1 \ldots C_{(2N-1)}$, and $C_0$ corresponds to the most significant character of the third string. Also, $C_0 C_1 \ldots C_{(N-1)}$ from among the third string corresponds to the second string output by the delay buffer 102, and $C_N C_{(N+1)} \ldots C_{(2N-1)}$ corresponds to the first string output by the input buffer 101.

Therefore, when a predetermined offset for generating the fourth string is given to be k, the fourth string that is positioned at the offset k from among the third string can be expressed as $C_k C_{(k+1)} \ldots C_{(k+N-1)}$. Further, when the number of the fourth strings that are simultaneously generated is given to be N, the fourth strings that can be generated from the third string become $C_0 C_1 \ldots C_{(N-1)}, C_1 C_2 \ldots C_N, \ldots, C_{(N-1)} C_N \ldots C_{(2N-2)}$ depending on k. Accordingly, the distributor 103 shifts the offset by each character in the third string, and extracts the fourth string. Hence, the fourth string may share at least one character with another fourth string.

The memory 104 divides at least one string to be detected from the input data stream into at least one sub-string and stores the same. That is, when the size of the string to be detected is L and L is greater than the size of the first string that is N, the memory 104 divides the corresponding string into sub-strings with the size that is less than N and stores them.

For example, when the string to be detected is "ABCDEFGHMNS," the string is divided into "ABCD," "EFGH," and "MNS," which are stored in the memory 104. The string to be detected from the input data stream will be referred to as the "target string."

When a plurality of the fourth strings output by distributor 103 correspond to the at least one sub-string stored in the memory 104, the comparator 105 outputs a detection signal for indicating that the corresponding sub-strings are detected. Here, the detection signal is sorted per sub-string and can be sorted per offset corresponding to the fourth string, and then is output to the concatenation circuit 106. Therefore, the concatenation circuit 106 can check which sub-string that corresponds to an offset is detected based on the detection signal.

The concatenation circuit 106 determines whether to detect the target string by checking whether the detection signals for the sub-strings that are included in the same target string and correspond to the same offset are sequentially input based on the detection signal output by the comparator 105, and when the target string is determined to be detected, the concatenation circuit 106 outputs a detection signal for indicating the detection. Here, the detection signal is identified by each target string and is output to the encoding circuit 107. Therefore, the encoding circuit 107 can check which target string is detected based on the detection signal.

Upon having determined that the target string is detected based on the detection signal output by the concatenation circuit 106, the encoding circuit 107 outputs a string ID corresponding to the detected target string.

An operation of the string matching device 100 will now be described with reference to FIG. 2.

It will be assumed that the target strings are "ABCDEFGHMNS," "EFGHMNOP," and "GHMNQR," the size N of the first string output by the input buffer 101 is 4, and the data stream that is input to the input buffer 101 is "XYABCDEFGHMNQROP . . . ."

Therefore, the target strings are divided into sub-strings including "ABCD," "EFGH," "MNS," "EFGH," "MNOP," "GHMN," and "QR" to be stored in the memory 104.

Referring to FIG. 2, the respective columns of Phase 1, Phase 2, and Phase 3 represent output data of the input buffer 101, and input data and output data of the distributor 103 in the corresponding stage.

That is, the input buffer 101 arranges the input data stream of Phase 1 by 4 bytes and sequentially outputs the first string. The delay buffer 102 delays the first string output by the input buffer 101 by 1 clock signal, and outputs the second string. Therefore, the first string and the second string are input to the distributor 103 by 8 bytes in a like manner of Phase 2, and are used to generate the third string.

For example, when the input buffer 101 outputs the first string "CDEF," the delay buffer 102 outputs "XYAB" output by the input buffer 101 by 1 clock signal in advance as the second string. Therefore, the two strings are combined by the distributor 103 to generate the third string "XYABCDEF."

The distributor 103 generates fourth strings corresponding to different offsets in a like manner of Phase 3 by using the third string that is generated by combining the first string and the second string.

For example, the distributor 103 generates and outputs the fourth strings "XYAB," "YABC," "ABCD," and "BCDE" from the third string "XYABCDEF" with different offsets. Here, "XYAB" is positioned on the offset 0, "YABC" on the offset 1, "ABCD" on the offset 2, and "BCDE" on the offset 3.

The fourth strings "XYAB," "YABC," "ABCD," and "BCDE" are simultaneously compared to the sub-strings "ABCD," "EFGH," . . . , "QR" stored in the memory 104 by the comparator 105. Each time a sub-string is detected from among the fourth string, the comparator 105 outputs a detection signal for indicating detection of a sub-string.

For example, when the data stream input to the input buffer 101 is "XYABCDEFGHMNQROP . . . ," the comparator 105 can detect the fourth strings corresponding to the sub-strings "ABCD," "EFGH," "GHMN," and "QR". Here, in the case of the sub-strings such as "MNS" or "QR" that do not have 4 bytes, the comparator 105 compares the sub-strings starting from the most significant byte of the fourth string by the length that corresponds to the length of the sub-string to be compared. That is, the comparator 105 compares the top 3 bytes of the fourth string and the "MNS" in the case of "MNS," and compares the top 2 bytes of the fourth string and "QR" in the case of "QR."

Referring to FIG. 2, the fourth strings that are positioned on the offset 0 from among the fourth strings output by the comparator 105 consecutively correspond to the sub-strings "GHMN" and "QR."

Therefore, the comparator 105 consecutively outputs detection signals for the two sub-strings that are sequentially input to the concatenation circuit 106. Also, the concatenation circuit 106 outputs a detection signal for indicating that the target string "GHMNQR" configured with "GHMN" and "QR" corresponding to the same offset is detected. When the two detection signals correspond to different offsets even if the detection signal for "GHMN" and the detection signal for "QR" are consecutively input, the concatenation circuit 106 determines that no target string has been detected.

Therefore, the encoding circuit 107 outputs a string ID that corresponds to "GHMNQR."

For example, when the string ID's 1, 2, and 3 are given to "ABCDEFGHMNS," "EFGHMNOP," and "GHMNQR," respectively, the encoding circuit 107 outputs 3 which is the string ID of "GHMNQR."

Figure 3:
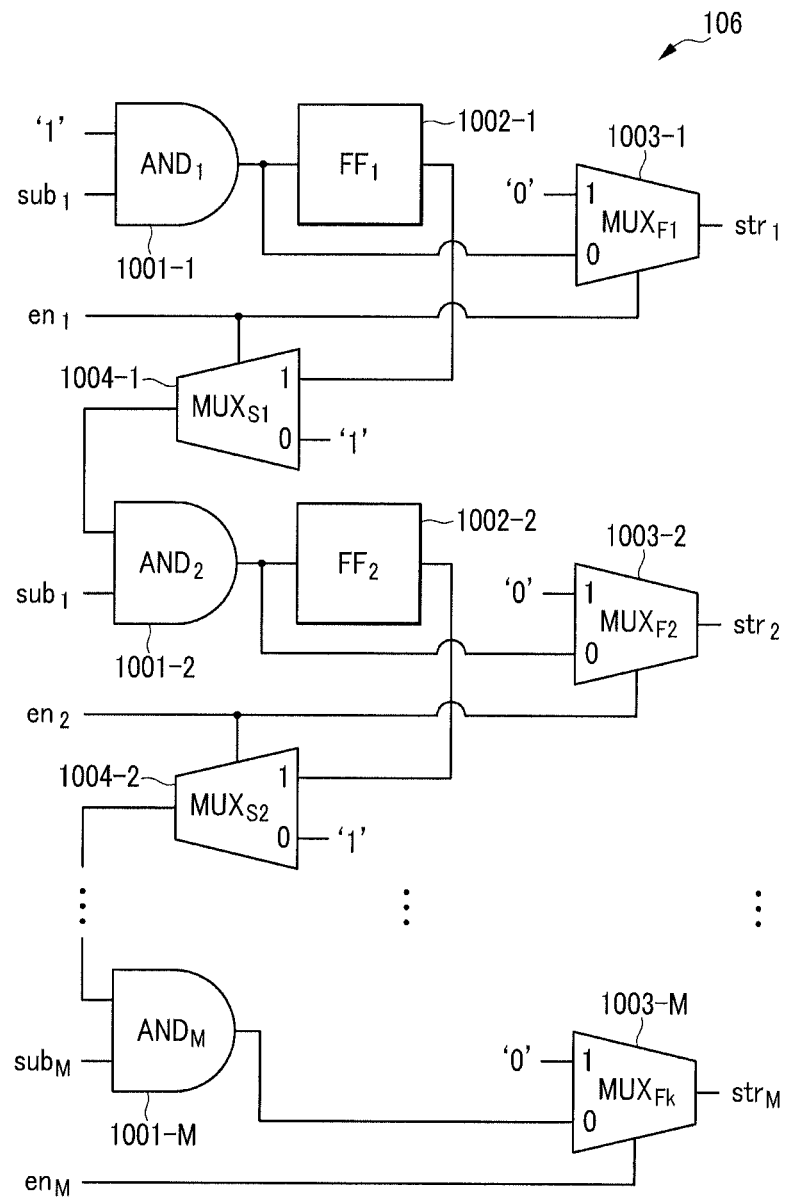
FIG. 3 shows a configuration diagram of a concatenation circuit according to a first exemplary embodiment of the present invention.

FIG. 3 shows a configuration diagram of a concatenation circuit according to a first exemplary embodiment of the present invention, showing the case of M stages.

Referring to FIG. 3, $sub_1$, $sub_2$, . . . , $sub_M$ are detection signals for the comparator 105 to indicate whether a sub-string is detected, and $str_1$, $str_2$, . . . , $str_M$ are detection signals of whether a target string is detected. Also, $en_1$, $en_2$, . . . , $en_M$ are control signals for connecting the outputs of the flipflops ($FF_1$, $FF_2$), 1002-1, 1002-2, . . . to the inputs of AND gates ($AND_1$, $AND_2$, . . . , $AND_M$) 1001-1, 1001-2, . . . , 1001-M or separating the outputs thereof from the inputs thereof, and are determined according to the connection states of the sub-strings corresponding to the respective sub-concatenation circuits. Also, the flip-flops 1002-1, 1002-2, . . . are connected to the AND gates 1002-1, 1002-2, . . . , 1002-P by second multiplexers ($MUX_{S1}$, $MUX_{S2}$) 1004-1, 1004-2, . . . .

For example, when $en_1$ is "1" in the second multiplexer 1004-1 of the first stage, the signal output by the flipflop 1002-1 of the first stage is input to the AND gate 1001-2 of the second stage. On the contrary, when $en_1$ is "0," the signal output by the flipflop 1002-1 of the first stage is not transmitted to the AND gate 1001-2 of the second stage. Therefore, the concatenation circuit 106 is divided into a plurality of sub-concatenation circuits or is connected to be operable by the control signals $en_1$, $en_2$, . . . , $en_M$.

A target string is detected by the connected sub-concatenation circuits. For example, when it is assumed that the target string is "ABCDEFGHMNS" and the size N of the first string output by the input buffer 101 is 4, "ABCDEFGHMNS" is divided into sub-strings including "ABCD," "EFGH," and "MNS."

Accordingly, detection signals for indicating detection of the sub-strings "ABCD," "EFGH," and "MNS" are sequentially input to the $sub_1$, $sub_2$, and $sub_3$ of the concatenation circuit 106 for each clock signal, and $str_3$ of the concatenation circuit 106 finally becomes "1" to show that the target string "ABCDEFGHMNS" is detected. Here, $en_1$ and $en_2$ are both set to be "1" and $en_3$ is set to be "0" so that the sub-concatenation circuits corresponding to the sub-strings "ABCD," "EFGH," and "MNS" may be connected with each other and may output the final detection result for "ABCDEFGHMNS."

Figure 4:
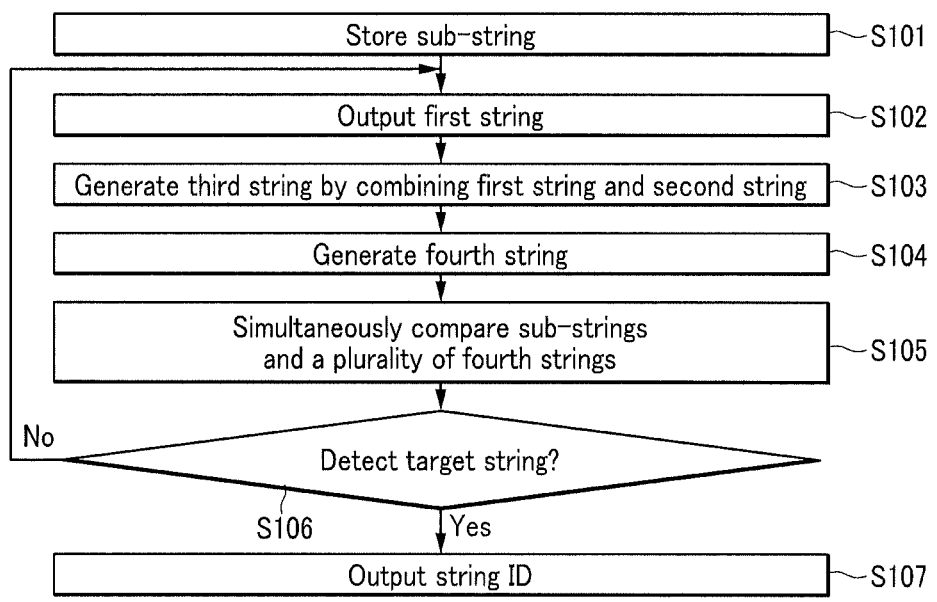
FIG. 4 shows a flowchart of a string matching method by a string matching device according to a first exemplary embodiment of the present invention.

FIG. 4 shows a flowchart of a string matching method by a string matching device according to a first exemplary embodiment of the present invention.

Referring to FIG. 4, the string matching device 100 divides at least one target string into at least one sub-string and stores the same in the memory 104 (S101). Here, the size of the sub-string is selected to be less than the size of the first string output by the input buffer 101.

When the data stream is input to the input buffer 101, the input buffer 101 arranges the input data stream by a predetermined size N to generate a string stream, temporarily stores the generated string stream, and outputs the first string of the size N included in the string stream for each clock signal (S102).

Therefore, the distributor 103 combines the first string that is output by the input buffer 101 and the second string that is output after the first string that is output by the input buffer 101 at the previous clock signal is delayed by the delay buffer 102 to generate a third string (S103), and generates a plurality of fourth strings with different offsets from the third string (S104). That is, the distributor 103 generates a plurality of fourth strings that have different start positions beginning from the third string and have the same size as the first string.

The comparator 105 simultaneously compares the fourth strings with the sub-strings stored in the memory 104, and when there are some fourth strings that correspond to the sub-strings, the comparator 105 outputs detection signals for indicating that the corresponding sub-strings are detected (S105).

Also, the concatenation circuit 106 checks whether the target string is detected (S106) by checking whether the detection signals for the sub-strings that are included in the same target string and correspond to the same offset are sequentially input based on the detection signal that is output by the comparator 105. When the detection signals for the corresponding sub-strings are sequentially input, the concatenation circuit 106 determines that the corresponding target string is detected, and outputs a detection signal for indicating the determination. Accordingly, the encoding circuit 107 outputs a string ID that corresponds to the detected target string in the concatenation circuit 106 (S107).

A string matching method and device according to a second exemplary embodiment of the present invention will now be described in detail with reference to FIG. 5 to FIG. 8.

Figure 5:
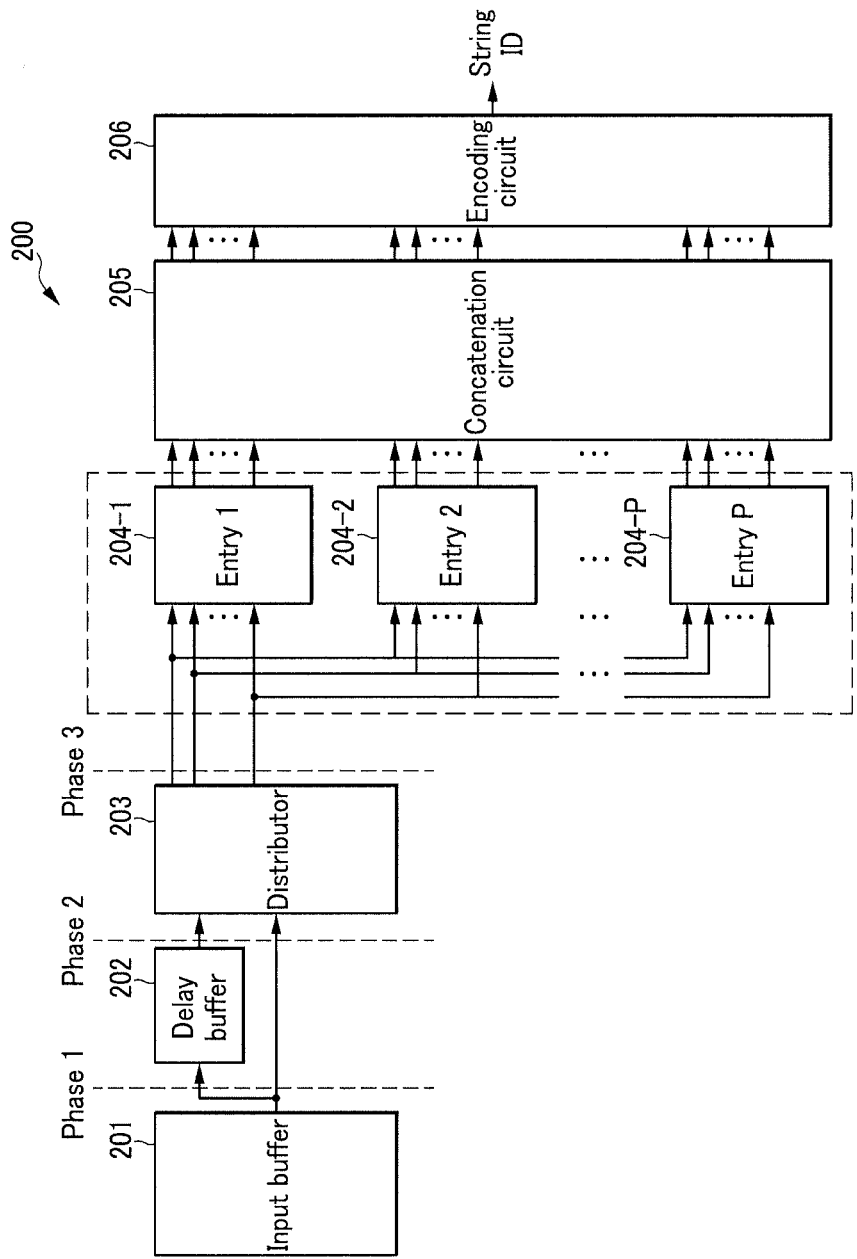
FIG. 5 shows a configuration diagram of a string matching device according to a second exemplary embodiment of the present invention.
Figure 6:
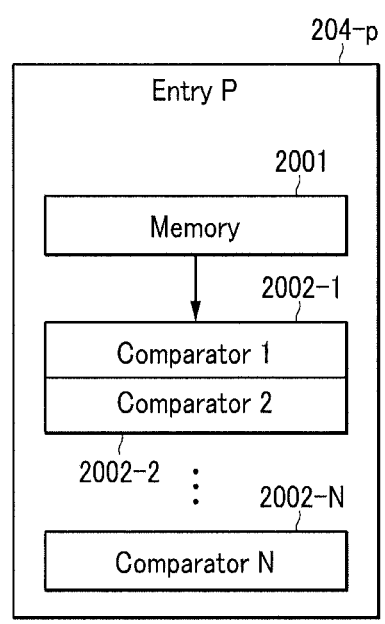
FIG. 6 shows a detailed configuration diagram of an entry and a concatenation circuit according to a second exemplary embodiment of the present invention.

FIG. 5 shows a configuration diagram of a string matching device according to a second exemplary embodiment of the present invention, FIG. 6 shows a detailed configuration diagram of an entry and a concatenation circuit according to a second exemplary embodiment of the present invention, and FIG. 7 shows an example of storing a sub-string of a target string per memory of each entry according to a second exemplary embodiment of the present invention.

Referring to FIG. 5, the string matching device 200 includes an input buffer 201, a delay buffer 202, a distributor 203, a plurality of entries 204-1, 204-2, ..., 204-P, a concatenation circuit 205, and an encoding circuit 206.

The input buffer 201, the delay buffer 202, and the distributor 203 of the string matching device 200 according to the second exemplary embodiment of the present invention perform the same operations as the input buffer 101, the delay buffer 102, and the distributor 103 of the string matching device 100 according to the first exemplary embodiment, so detailed descriptions thereof will not be provided.

Referring to FIG. 6, the entries 204-1, 204-2, ..., 204-P include a memory 2001 and a plurality of comparators 2002-1, 2002-2, ..., 2002-N. Here, the number of the comparators 2002-1, 2002-2, ..., 2002-N included in the entry 204-$p$ corresponds to the size N of the first string that is output by the input buffer 201.

The memory 2001 stores one of the sub-strings of at least one target string. For example, when the length of the target string is L and the size of the first string output by the input buffer 201 is N, the target string is divided into sub-strings with the size that is less than N, and the sub-strings are stored in the memory 2001 of the entry 204-$p$.

For example, when it is assumed that the target string is "EFGHMNOP" and N is 4, "EFGHMNOP" is divided into the sub-string "EFGH" and the sub-string "MNOP," and the sub-strings are stored in the memory 2001 of the first entry 204-1 and the second entry 204-2, respectively. That is, "EFGH" is stored in the memory 2001 of the first entry 204-1, and "MNOP" is stored in the memory 2001 of the second entry 204-2.

The comparators 2002-1, 2002-2, ..., 2002-N are classified by the offsets in a like manner of the method for classifying the fourth strings, and when the fourth string that corresponds to the same offset from among a plurality of fourth strings that are output by the distributor 203 is compared to the sub-string that is stored in the memory 2001 and they are found to correspond with each other, the comparators 2002-1, 2002-2, ..., 2002-N output a detection signal for indicating that the corresponding sub-string is detected. Different fourth strings are input to a plurality of comparators 2002-1, 2002-2, ..., 2002-N included in a single entry 204-$p$. That is, when the fourth strings output by the distributor 203 are input to the entry 204-$p$, they are divided for the respective offsets to be input to the respective comparators 2002-1, 2002-2, ..., 2002-N.

Therefore, when the distributor 203 outputs the fourth strings that are provided at N different offsets, the entry 204-$p$ uses the N comparators 2002-1, 2002-2, ..., 2002-N to compare the corresponding sub-strings and the N fourth strings, and when the fourth strings correspond to the sub-strings, the entry 204-$p$ outputs a detection signal for indicating that the corresponding sub-string is detected.

When the sub-string stored in the memory 2001 has a size that is less than that of the first string, the comparators 2002-1, 2002-2, ..., 2002-N combine "don't care" bytes with the corresponding sub-string to update the sub-string to be the same size of the first string, and compares the updated sub-string and the fourth string. The "don't care" term signifies that the corresponding byte may have any type of data.

For example, when it is assumed that N is 4 and the target string is "GHMNQR," the target string is divided into sub-strings "GHMN" and "QR."

Therefore, "QR" needs 2 more bytes so as to have a 4-byte data form, and the added 2 bytes become "don't care" terms.

Referring to FIG. 5, the concatenation circuit 205 classifies the detection signals output by the entries 204-1, 204-2, ..., 204-P for the respective offsets, and checks whether the sub-strings that are included in the same target string and correspond to the same offset are sequentially input to determine whether to detect the target string.

When the target string is determined to have been detected, the concatenation circuit 205 outputs a detection signal for indicating the determination. Here, the concatenation circuit 205 outputs the detection signal by the target strings. Therefore, the encoding circuit 206 can check which target string is detected based on the detection signal.

Upon having determined that the target string is detected based on the detection signal output by the concatenation circuit 106, the encoding circuit 206 outputs a string ID of the corresponding target string.

An operation of the string matching device 200 will now be described with reference to FIG. 2 and FIG. 7.

First, it will be assumed that the size N of the first string is 4, the number P of the entry 204-p is 7, and the target strings are "ABCDEFGHMNS," "EFGHMNOP," and "GHMNQR."

Therefore, as shown in FIG. 7, the sub-strings "ABCD," "EFGH," "MNS*," "EFGH," "MNOP," "GHMN," and "QR**" are stored in the memory 2001 of the entry 204-p. Here, "*" of "MNS*" and "QR**" represent "don't care" terms. Therefore, the comparators 2002-1, 2002-2, ..., 2002-N of the third entry 204-3 output detection signals based on the result of comparing 3 characters "MNS" irrespective of the last byte of "MNS*."

Also, the comparators 2002-1, 2002-2, ..., 2002-N of the seventh entry 204-7 output detection signals based on the result of comparing two characters "QR" of "QR**."

When it is assumed that "XYABCDEFGHMNQROP..." is input to the input data stream, as shown in FIG. 2, the distributor 203 outputs the fourth strings "XYAB," "YABC," "ABCD," and "BCDE" in the first stage. Therefore, it is found that the sub-string "ABCD" stored in the memory 2001 of the first entry 204-1 corresponds to the fourth string "ABCD" corresponding to the offset 2. Further, since the fourth string corresponding to the offset 2 is input to the third comparator 2002-3, the third comparator 2002-3 of the first entry 204-1 outputs a detection signal for indicating that the corresponding sub-string is detected to the concatenation circuit 205.

Also, in the third stage, the distributor 203 outputs the fourth strings "GHMN," "HMNQ," MNQR," and "NQRO."

Therefore, it is found that the sub-string "GHMN" stored in the memory 2001 of the sixth entry 204-6 corresponds to the fourth string "GHMN" corresponding to the offset 0. Since the fourth string corresponding to the offset 0 is input to the first comparator 2002-1, the first comparator 2002-1 of the sixth entry 204-6 outputs a detection signal for indicating that the sub-string is detected to the concatenation circuit 205.

Also, in the fourth stage, the distributor 203 outputs a fourth string such as "QROP."

Hence, it is found that the sub-string "QR**" stored in the memory 2001 of the seventh entry 204-7 corresponds to the fourth string "QROP" corresponding to the offset 0. Since the fourth string "QROP" corresponding to the offset 0 is input to the first comparator 2002-1, the first comparator 2002-1 of the seventh entry 204-7 outputs a detection signal for indicating that the corresponding sub-string is detected to the concatenation circuit 205.

Therefore, since the detection signal for "GHMN" and the detection signal for "QR" corresponding to the same offset are sequentially input, the concatenation circuit 205 determines that the target string "GHMNQR" is detected and outputs a detection signal for indicating the determination. When the detection signal for "GHMN" and the detection signal for "QR" are sequentially input but they correspond to different offsets, the concatenation circuit 205 determines that the target string is not detected.

Figure 8:
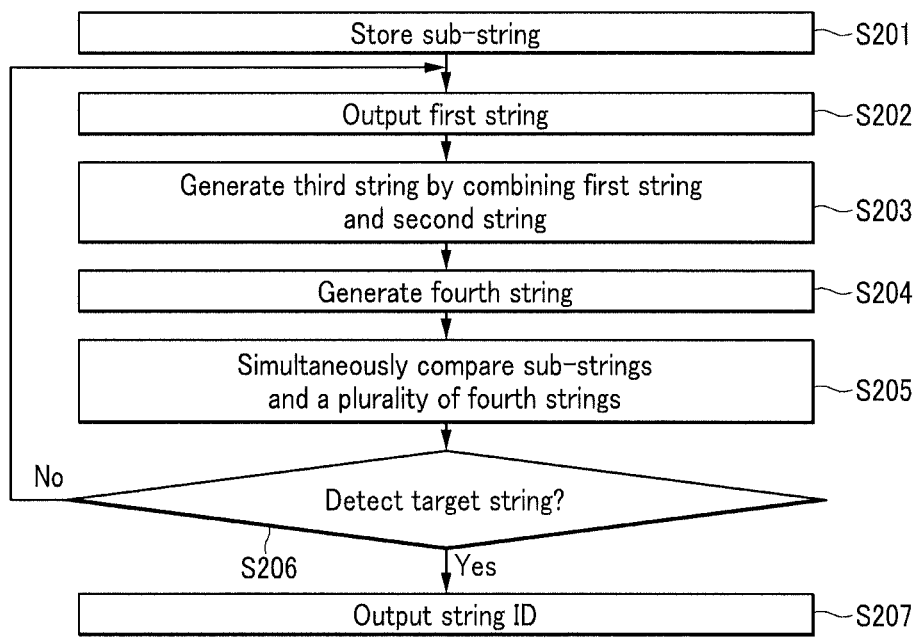
FIG. 8 shows a flowchart of a string matching method of a string matching device according to a second exemplary embodiment of the present invention.

FIG. 8 shows a flowchart of a string matching method of a string matching device according to a second exemplary embodiment of the present invention.

Referring to FIG. 8, the string matching device 200 divides at least one target string into at least one sub-string, and stores the sub-strings in the memory 2001 of the entry 204-p (S201).

When a data stream is input to the input buffer 201, the input buffer 201 arranges the input data stream with a predetermined size N to generate a string stream, temporarily stores the generated string stream, and outputs the first string with the size N included in the string stream for each clock signal (S202).

Therefore, the distributor 203 generates a third string by combining a first string that is output by the input buffer 201 and a second string that is output by delaying the first string that is output by the input buffer 201 at the previous clock signal through the delay buffer 202 (S203), and generates a plurality of fourth strings with different offsets from the third string (S204). That is, the distributor 203 generates a plurality of fourth strings that have different start positions and have the same size as the first string from the third string.

The entries 204-1, 204-2, ..., 204-P simultaneously compare the sub-string stored in the corresponding memory 2001 and a plurality of fourth strings by using the comparators 2002-1, 2002-2, ..., 2002-N that are classified by the offset, and when the fourth string corresponds to the sub-string, the same output detection signals for indicating that a corresponding sub-string is detected (S205).

Also, the concatenation circuit 205 classifies the detection signals output by the entries 204-1, 204-2, ..., 204-P by offsets, and checks a detection state of the target string by checking whether the detection signals for the sub-strings that are included in the same target string for the respective offsets and correspond to the same offset are sequentially input (S206).

When the detection signals for the corresponding sub-strings are sequentially input, the concatenation circuit 205 determines that the corresponding target string is detected, and outputs a detection signal for indicating the determination. Hence, the encoding circuit 206 outputs a string ID that corresponds to the target string that is detected by the concatenation circuit 205 (S207).

A string matching method and device according to a third exemplary embodiment of the present invention will now be described with reference to FIG. 9 and FIG. 10.

Figure 9:
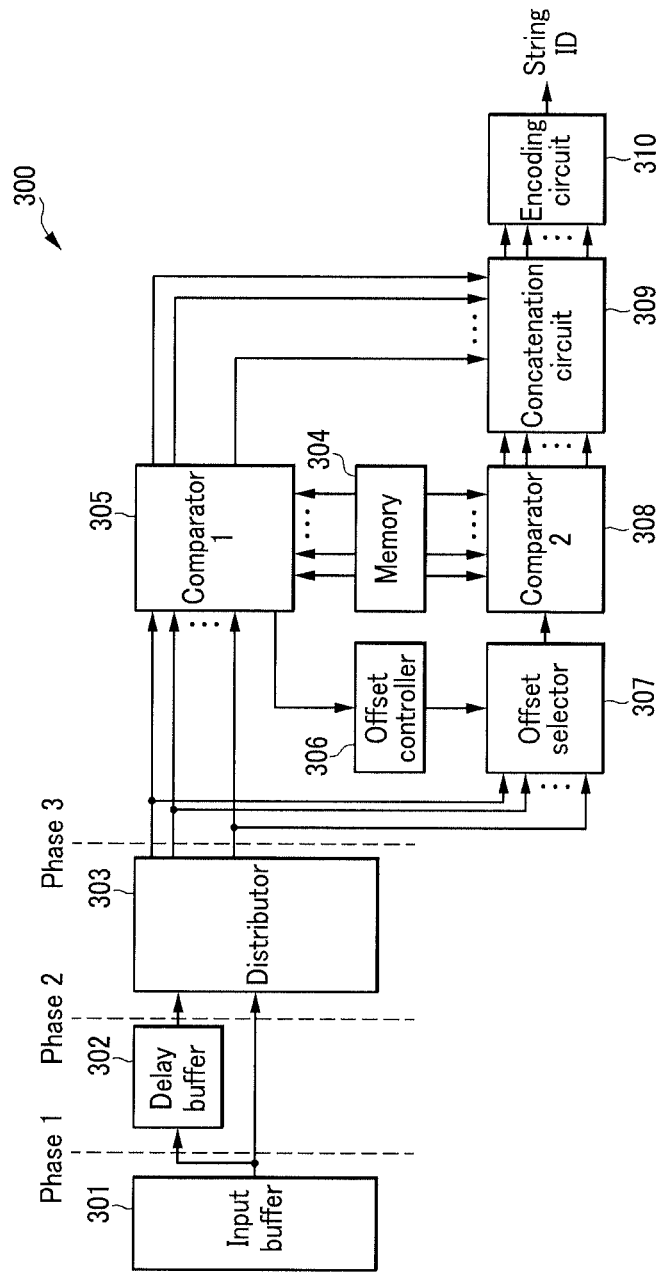
FIG. 9 shows a configuration diagram of a string matching device according to a third exemplary embodiment of the present invention.

FIG. 9 shows a configuration diagram of a string matching device according to a third exemplary embodiment of the present invention.

Referring to FIG. 9, the string matching device 300 includes an input buffer 301, a delay buffer 302, a distributor 303, a memory 304, a first comparator 305, an offset controller 306, an offset selector 307, a second comparator 308, a concatenation circuit 309, and an encoding circuit 310.

The input buffer 301, the delay buffer 302, and the distributor 303 of the string matching device 300 according to the third exemplary embodiment of the present invention perform the same functions as the input buffer 101, the delay buffer 102, and the distributor 103 of the string matching device 100 according to the first exemplary embodiment, so no detailed description thereof will be provided.

The memory 304 divides at least one target string into at least one sub-string and stores the same. For example, when the length of the target string is L and the size of the first string output by the input buffer 301 is N, the target string is divided into sub-strings with the size that is less than N to be stored in the memory 304. The most significant sub-string from among the sub-strings will be called a prefix hereinafter.

The first comparator 305 simultaneously compares a plurality of fourth strings output by the distributor 303 with at least one prefix stored in the memory 304.

When a fourth string corresponds to the prefix, the first comparator 305 outputs a detection signal for indicating that the corresponding prefix is detected. Here, the detection signal is classified by the offset that corresponds to the fourth string in addition to by the prefix, and is then output. Therefore, the concatenation circuit 309 can check which prefix is detected based on the detection signal, and the offset controller 306 can check to which offset it corresponds based on the detection signal.

The offset controller 306 outputs an offset control signal by using offset information of the fourth string corresponding to a detection signal based on the detection signal output by the first comparator 305. In the initial state of the offset control signal, no fourth string is selected.

The offset selector 307 selects one of the fourth strings output by the distributor 303 based on the offset control signal output by the offset controller 306, and outputs it.

The second comparator 308 simultaneously compares the fourth string selected by the offset selector 307 and the sub-strings that are stored in the memory 304, and when there is a sub-string that corresponds to the selected fourth string from among the corresponding sub-strings, the second comparator 308 outputs a detection signal for indicating the correspondence. Here, the detection signal is divided by the respective sub-strings to be output. Hence, the concatenation circuit 309 can check which sub-string is detected based on the detection signal.

The concatenation circuit 309 checks whether a prefix that is included in the same target string and corresponds to the same offset and detection signals for remaining sub-strings are sequentially input based on the detection signals output by the first comparator 305 and the second comparator 308.

When the corresponding prefix and the detection signals for the residual sub-strings are sequentially input, the concatenation circuit 309 determines that the corresponding target string is detected, and outputs a detection signal for indicating the determination. Here, the detection signals are output by the target strings. Therefore, the encoding circuit 310 can check which target string is detected based on the detection signals.

The encoding circuit 310 outputs an ID of a target string when the concatenation circuit 309 outputs a detection signal for indicating that the corresponding target string is detected.

An operation of the string matching device 300 will now be described with reference to FIG. 2.

First, it will be assumed that the target strings are "ABCDEFGHMNS," "EFGHMNOP," and "GHMNQR," and the size N of the first string output by the input buffer 101 is 4. Therefore, the target strings are divided into sub-strings "ABCD," "EFGH," "MNS," "EFGH," "MNOP," "GHMN," and "QR" that are stored in the memory 304. Here, "ABCD," "EFGH," and "GHMN" are classified by the prefix of the target strings.

When it is assumed that "XYABCDEFGHMNQROP . . ." is input to the input data stream, the distributor 303 outputs the fourth strings "XYAB," "YABC," "ABCD," and "BCDE" at the first stage as shown in FIG. 2. Therefore, "ABCD" positioned at the offset 2 from among the fourth strings corresponds to the prefix "ABCD" of the target string "ABCDEFGHMNS."

Accordingly, the first comparator 305 outputs a detection signal for indicating that the prefix "ABCD" of the target string "ABCDEFGHMNS" is detected. Further, since the detection signal corresponds to the offset 2, the offset controller 306 outputs an offset control signal for selecting the fourth string corresponding to the offset 2 in the next stage.

The offset selector 307 selects the fourth string that corresponds to the offset 2 from among a plurality of fourth strings that are input based on the offset control signal output by the offset controller 306, and outputs the same. Therefore, in the second stage, the offset selector 307 selects the fourth string "EFGH" corresponding to the offset 2 from among the fourth strings "CDEF," "DEFG," "EFGH," and "FGHM" output by the distributor 303, and outputs it.

Accordingly, the second comparator 308 compares the fourth string "EFGH" selected by the offset selector 307 and the sub-strings except the prefix, checks that the selected fourth string "EFGH" corresponds to the sub-string "EFGH," and outputs a detection signal for indicating that the sub-string "EFGH" is detected.

"EFGH" positioned at the offset 2 from among the fourth strings "CDEF," "DEFG," "EFGH," and "FGHM" output by the distributor 303 corresponds to the prefix "EFGH" of the target string "EFGHMNOP."

Therefore, the first comparator 305 outputs a detection signal for indicating that the prefix "EFGH" is detected.

However, in this case, the offset controller 306 does not change the offset control signal since the prefix that corresponds to the offset 2 is detected in the previous stage when the prefix is detected. That is, in this case, the offset controller 306 processes in advance that the sub-string "EFGH" is detected.

In the third stage, no sub-string that corresponds to the fourth string "MNQR" corresponding to the offset 2 output by the offset selector 307 is detected from among the residual sub-strings except the prefix. On the other hand, in the third stage, "GHMN" that is positioned at the offset 0 from among a plurality of fourth strings output by the distributor 303 corresponds to the prefix "GHMN" of the target string "GHMNQR."

Therefore, the first comparator 305 outputs a detection signal for indicating that the prefix "GHMN" is detected. Also, the offset controller 306 outputs an offset control signal for controlling to select the fourth string corresponding to the offset 0 in the next stage since there is no sub-string that is detected through the second comparator 308 in the third stage and the fourth string "GHMN" that corresponds to the offset 0 corresponds to the prefix "GHMN."

Therefore, in the fourth stage, the offset selector 307 selects the fourth string "QROP" that corresponds to the offset 0 from among the fourth strings output by the distributor 303 and outputs the same, and the second comparator 308 checks that the two top characters of the fourth string "QROP" corresponds to the sub-string "QR" stored in the memory 304 and outputs a detection signal for indicating the correspondence. In the case of the sub-string having a size that is less than N in a like manner of "MNS" or "QR," the second comparator 308 compares the fourth string and the above-noted sub-string by the length of the sub-string to be compared beginning from the most significant character. That is, in the case of the sub-string "MNS," the second comparator 308 compares the top three characters of the fourth string with the sub-string "MNS," and in the case of the sub-string "QR," it compares the top two characters of the fourth string with the sub-string "QR."

Since the detection signal for the prefix "GHMN" corresponding to the same offset and the detection signal for the sub-string "QR" are sequentially input based on the detection signals output by the first comparator 305 and the second comparator 308, the concatenation circuit 309 determines that the target string "GHMNQR" is detected and outputs a detection signal for indicating the determination.

Figure 10:
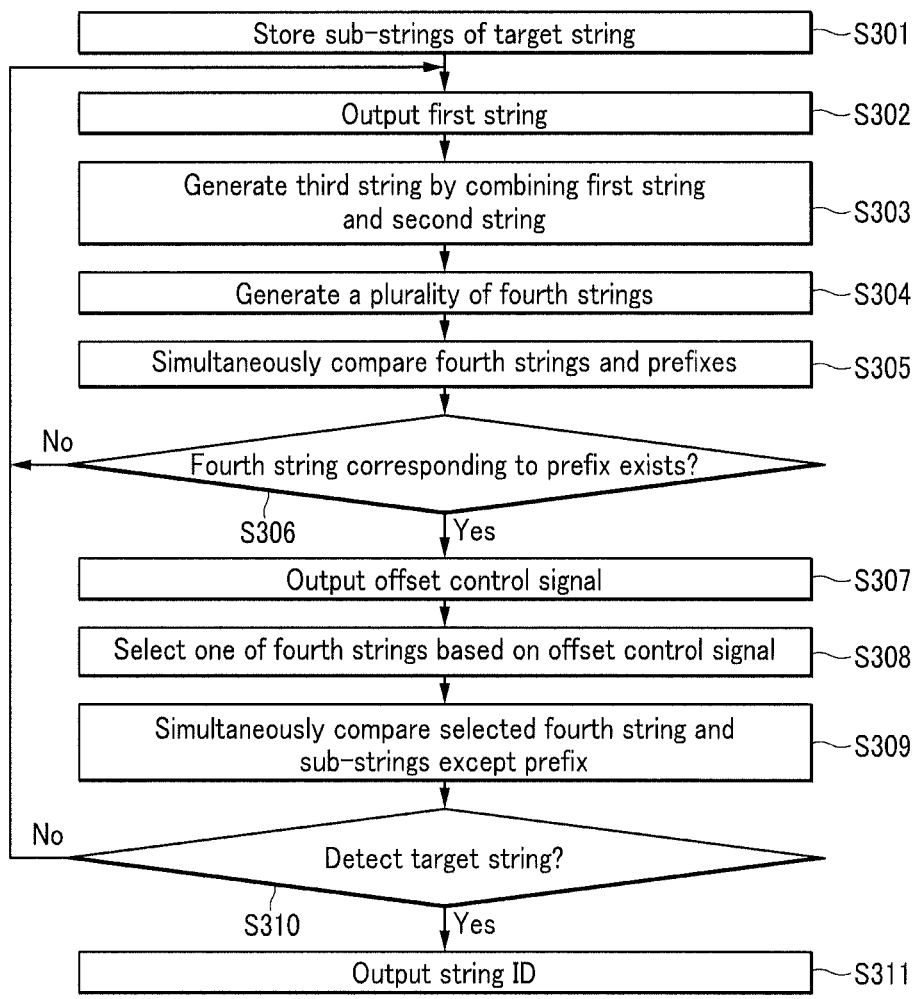
FIG. 10 shows a flowchart of a string matching method by a string matching device according to a third exemplary embodiment of the present invention.

FIG. 10 shows a flowchart of a string matching method by a string matching device according to a third exemplary embodiment of the present invention.

In the string matching method according to the third exemplary embodiment of the present invention, the processes S302 to S304 are performed in a like manner of the processes S102 to S104 of the string matching method according to the first exemplary embodiment, and hence no detailed description thereof will be provided.

Referring to FIG. 10, the string matching device 300 divides at least one target string into at least one sub-string, divides sub-strings into a prefix and other sub-strings except the prefix, and stores them in the memory 304 (S301). Here, the size of the sub-string is selected to be less than that of the first string output by the input buffer 301.

When a plurality of fourth strings are generated by the distributor 303, the first comparator 305 simultaneously compares the fourth strings with the prefixes stored in the memory 304 (S305), checks whether there are a fourth string and a prefix that correspond with each other (S306), and outputs a detection signal for indicating that the corresponding prefix is detected when a fourth string and a prefix that correspond with each other are found. Also, the offset controller 306 outputs an offset control signal by using offset information of the fourth string corresponding to a detection signal based on the detection signal output by the first comparator 305 (S307).

The offset selector 307 selects one of the fourth strings output by the distributor 303 based on the offset control signal output by the offset controller 306, and outputs it (S308). Accordingly, the second comparator 308 simultaneously compares the fourth string selected by the offset selector 307 and the sub-strings that are stored in the memory 304 (S309), and when there exists a sub-string that corresponds to the selected fourth string, it outputs a detection signal for indicating the existence.

When the sub-string is detected through the first comparator 305 and the second comparator 308, the concatenation circuit 309 checks whether the detection signals for the prefix that is included in the same target string and corresponds to the same offset and residual sub-strings except the prefix are sequentially input, and when the detection signals for the corresponding sub-string are sequentially input, it determines that the corresponding target string is detected (S310) and outputs a detection signal for indicating the determination.

Accordingly, the encoding circuit 310 finally outputs a string ID of the detected target string (S311).

A string matching method and device according to a fourth exemplary embodiment of the present invention will now be described in detail with reference to FIG. 11 to FIG. 18.

A state transition process used for the fourth exemplary embodiment of the present invention will now be described before the fourth exemplary embodiment of the present invention is described.

In general, the state transition process represents a process in which the current state transits to the next state according to the current state and input data. Therefore, a lookup memory for storing a plurality of data included in the corresponding process and state values relating to the respective data is needed so as to perform the state transition process. Also, a state transition memory for storing the state values for indicating the next states that can be transited is needed.

That is, a system for performing the state transition process compares the input data and state variables for indicating current states with the data that are stored in the lookup memory and state values relating to the data. Further, when there is a state value that corresponds to the state variable according to the comparison result, that is, when the lookup memory has data relating to the current state, the system reads an index corresponding to the pair of the corresponding data and the state value of the corresponding data from the lookup memory.

The system reads a state value for indicating the next state of the current state from the state transition memory based on the index that is read from the lookup memory, and updates the state variable for indicating the current state based on the state value. That is, the system for performing the state transition process changes the state variable for indicating the current state according to the state value for indicating the next state, and is then transited to the next state.

Figure 11:
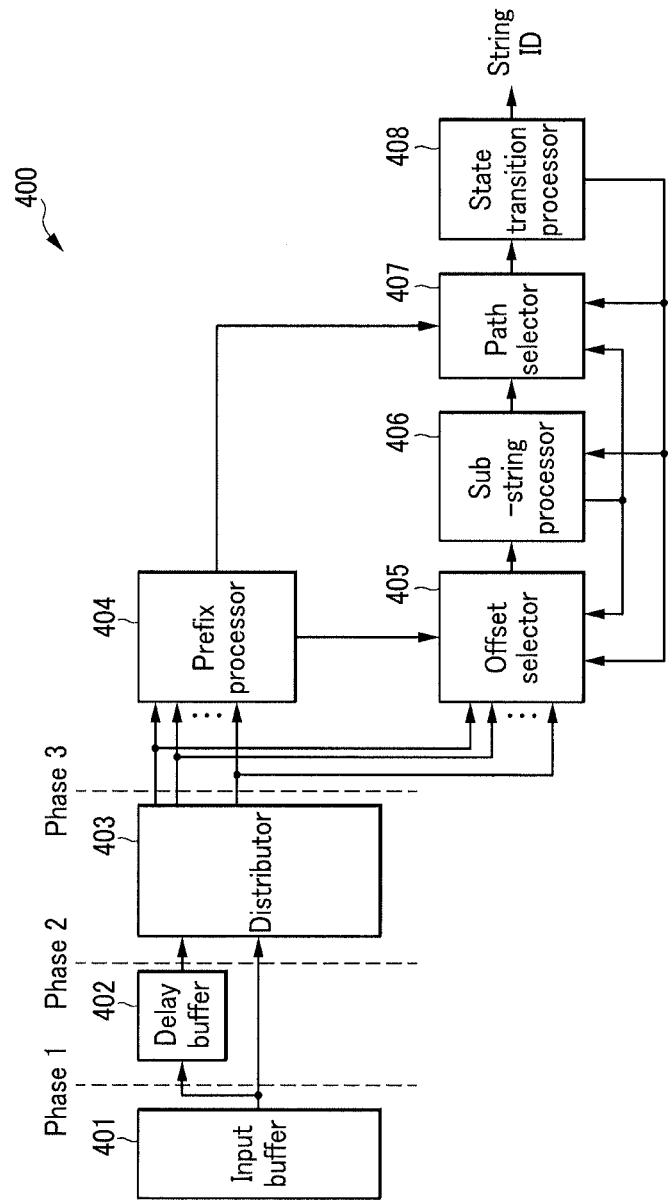
FIG. 11 shows a configuration diagram of a string matching device according to a fourth exemplary embodiment of the present invention.
Figure 12:
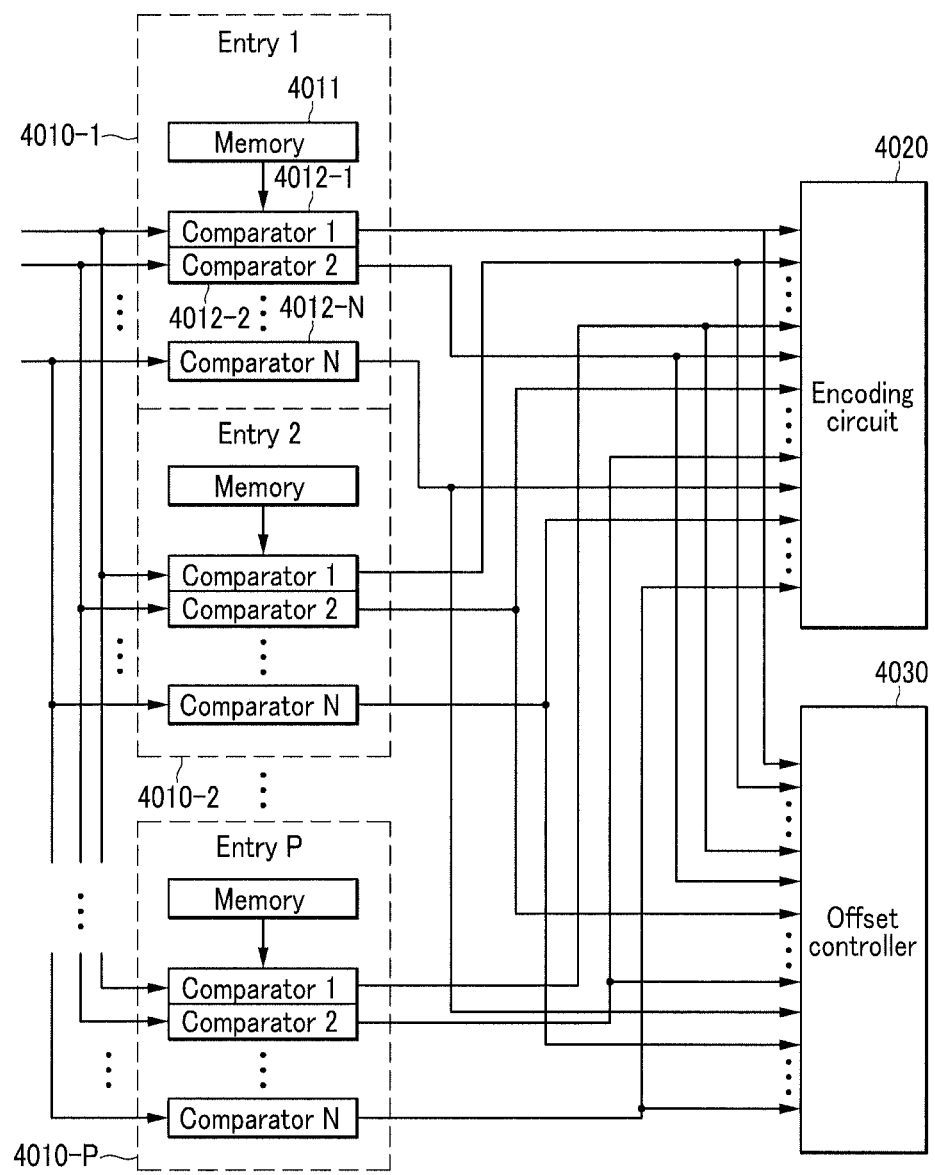
FIG. 12 shows a configuration diagram of a prefix processor according to a fourth exemplary embodiment of the present invention.
Figure 13:
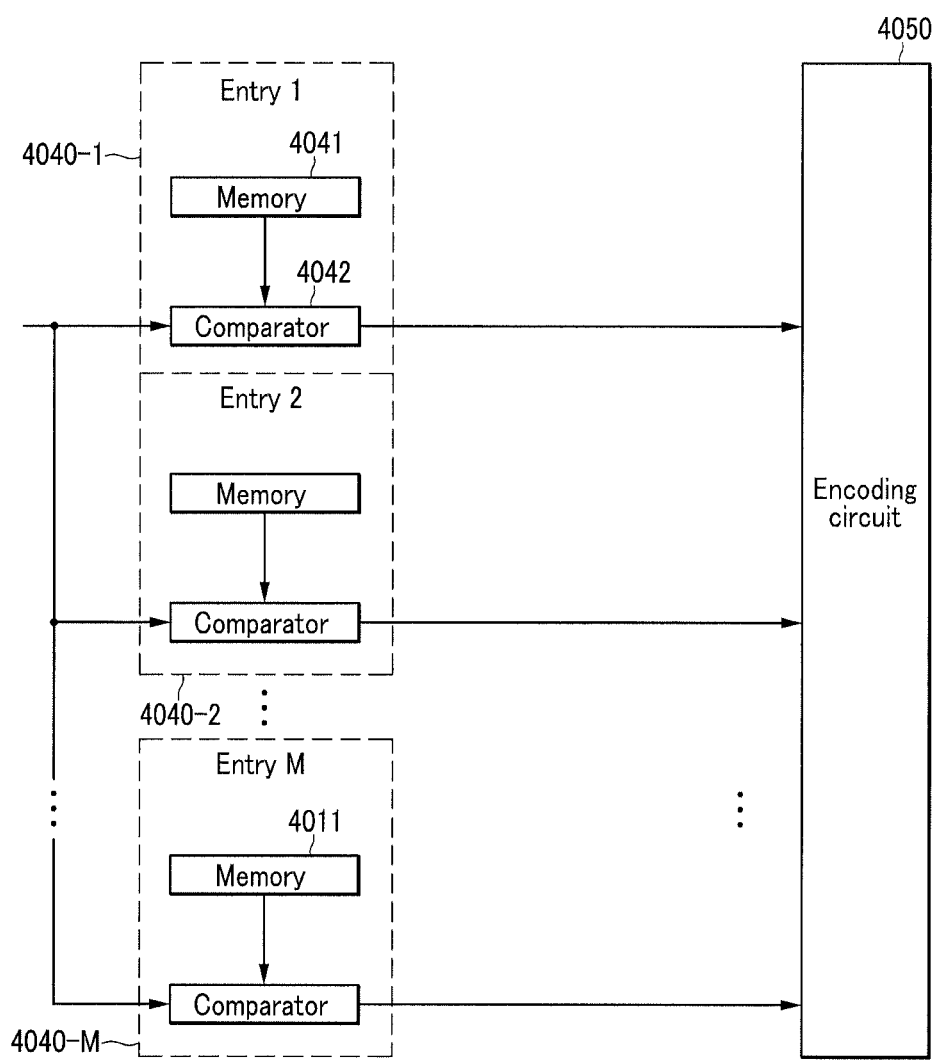
FIG. 13 shows a configuration diagram of a sub-string processor according to a fourth exemplary embodiment of the present invention.
Figure 14:
FIG. 14 and FIG. 15 show an example of a state transition process according to a fourth exemplary embodiment of the present invention.
Figure 15:
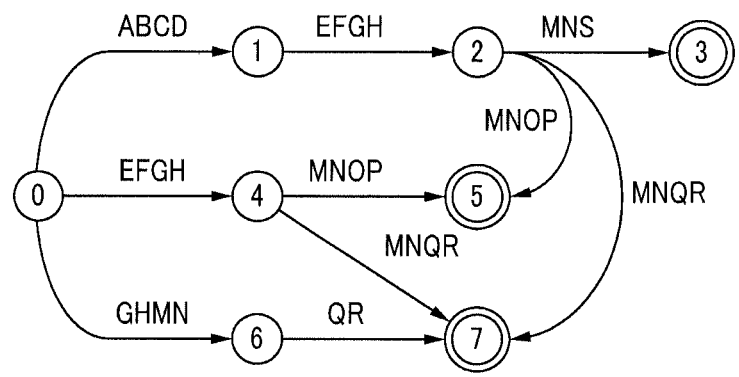
Figure 16:
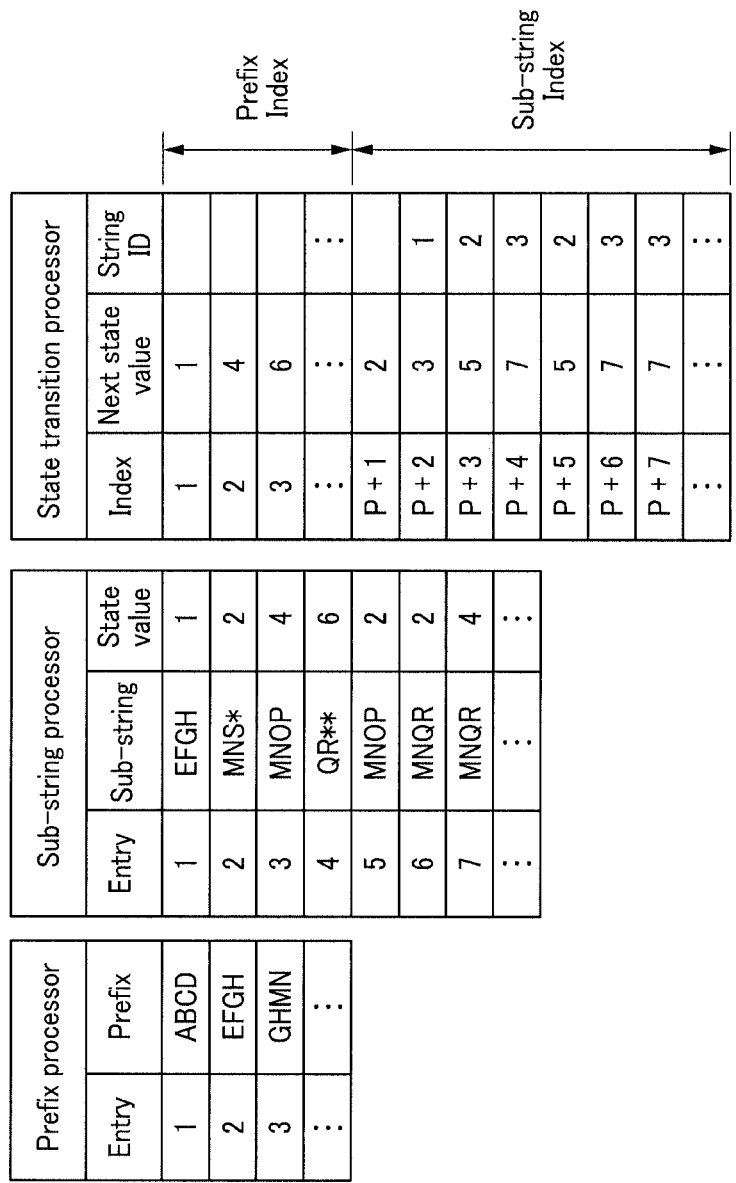
FIG. 16 shows an example of data that are stored in respective constituent elements according to a fourth exemplary embodiment of the present invention.

FIG. 11 shows a configuration diagram of a string matching device according to a fourth exemplary embodiment of the present invention. FIG. 12 shows a configuration diagram of a prefix processor according to a fourth exemplary embodiment of the present invention, and FIG. 13 shows a configuration diagram of a sub-string processor according to a fourth exemplary embodiment of the present invention. Also, FIG. 14 and FIG. 15 show an example of a state transition process according to a fourth exemplary embodiment of the present invention, and FIG. 16 shows an example of data that are stored in respective constituent elements according to a fourth exemplary embodiment of the present invention.

Referring to FIG. 11, the string matching device includes an input buffer 401, a delay buffer 402, a distributor 403, a prefix processor 404, an offset selector 405, a sub-string processor 406, a path selector 407, and a state transition processor 408.

The input buffer 401, the delay buffer 402, and the distributor 403 of the string matching device 400 according to the fourth exemplary embodiment of the present invention perform the same functions of the input buffer 101, the delay buffer 102, and the distributor 103 of the string matching device 100 according to the first exemplary embodiment, so no detailed corresponding description will be provided.

At least one target string is divided into at least one sub-string. For example, when the length of the target string is L and the size of the first string output by the input buffer 401 is N, the target string is divided into sub-strings having the size less than N. The most significant sub-string from among the sub-strings will be called the "prefix."

Referring to FIG. 12, the prefix processor 404 includes a plurality of entries 4010-1, 4010-2, . . . , 4010-P, an offset controller 4030, and an encoding circuit 4020.

Further, the entries 4010-1, 4010-2, . . . , 4010-P respectively include a memory 4011 and a plurality of comparators 4012-1, 4012-2, . . . , 4012-N. In this instance, the number of comparators 4012-1, 4012-2, . . . , 4012-N included in the respective entries 4010-1, 4010-2, . . . , 4010-P is set according to the size N of the first string output by the input buffer 401.

The memory 4011 stores the prefix. Here, different prefixes are stored in the memory 4011 corresponding to the entries 4010-1, 4010-2, . . . , 4010-P.

For example, when it is assumed that the size N of the first string is 4 and the target string includes "ABCDEFGHMNS," "EFGHMNOP," and "GHMNQR," the prefix "ABCD" of "ABCDEFGHMNS" is stored in the memory 4011 of the first entry 4010-1. Also, the prefix "EFGH" of "EFGHMNOP" is stored in the memory 4011 of the second entry 4010-2, and the prefix "GHMN" of "GHMNQR" is stored in the memory 4011 of the third entry 4010-3. When there is another target string "ABCDMNOP," the prefix "ABCD" of "ABCDM- NOP" need not use another entry since it is stored in the memory 4011 of the first entry 4010-1.

The respective comparators 4012-1, 4012-2, . . . , 4012-N are divided according to the offsets in a like manner of the fourth string classifying method, and compare the fourth string of the corresponding offset from among a plurality of the fourth strings output by the distributor 403 and the prefix that is stored in the memory 4011, and outputs a detection signal for indicating that the corresponding prefix is detected when the fourth string corresponds to the prefix.

Here, in the case of comparing the prefix and the fourth string, the comparators 4012-1, 4012-2, . . . , 4012-N combine the bytes of the "don't care" term and the corresponding prefix, updates them to be the same size of the first string, and compares then when the size of the corresponding prefix is less than the size of the first string.

In addition, different fourth strings are input to a plurality of comparators 4012-1, 4012-2, . . . , 4012-N included in one of the entries 4010-1, 4010-2, . . . , 4010-P. That is, a plurality of fourth strings are divided by the offsets and are input to the comparators 4012-1, 4012-2, . . . , 4012-N. That is, the comparators 4012-1, 4012-2, . . . , 4012-N compare the fourth strings having different offsets and the prefixes to output detection signals.

Therefore, the encoding circuit 4020 and the offset controller 4030 can check the detected prefix and the offset of the fourth string corresponding to the detected prefix by checking the comparators 4012-1, 4012-2, . . . , 4012-N for outputting the detection signal.

The encoding circuit 4020 classifies the detection signals output by the comparators 4012-1, 4012-2, . . . , 4012-N of the entries 4010-1, 4010-2, . . . , 4010-P by the offsets, and selects one of the detection signals output by the entries 4010-1, 4010-2, . . . , 4010-P. Here, the encoding circuit 4020 sets priorities in the order of the detection signal corresponding to the offset 0, the detection signal corresponding to the offset 1, . . . , and the detection signal corresponding to the offset N−1, and selects the detection signal with the greatest priority so that the detection signal corresponding to the offset 0 may have the greatest priority, and then it encodes the selected detection signal with the index to output a prefix index corresponding to the detected prefix and simultaneously output the detection signal for indicating that a prefix is detected.

The offset controller 4030 classifies the detection signals output by the comparators 4012-1, 4012-2, . . . , 4012-N of the entries 4010-1, 4010-2, . . . , 4010-P for the respective offsets, selects the same detection signal as that selected by the encoding circuit 4020 from among the detection signals output by the entries 4010-1, 4010-2, . . . , 4010-P, and outputs an offset control signal by using offset information of the fourth string corresponding to the selected detection signal.

Referring to FIG. 11, the offset selector 405 selects one of the fourth strings output by the distributor 403 and outputs the same based on the offset control signal output by the offset controller 4030 of the prefix processor 404. Here, the offset selector 405 does not change the selected offset based on the state variable for indicating the current state when a substring for the target string from which a prefix is detected is detected when the offset control signal is input.

Referring to FIG. 13, the sub-string processor 406 is realized with a ternary content addressable memory (TCAM), and includes a plurality of entries 4040-1, 4040-2, . . . , 4040-M and an encoding circuit 4050.

Also, the entries 4040-1, 4040-2, . . . , 4040-M respectively include a memory 4041 and a comparator 4042.

The memory 4041 stores the sub-string and a state value that can correspond to the sub-string. Here, the entries 4040-1, 4040-2, . . . , 4040-M store the pairs of different {sub-string, state value} in the corresponding memory 4041.

The comparator 4042 compares the fourth string selected and output by the offset selector 405 and sub-string stored in the memory 4041, and simultaneously compares the state value corresponding to the sub-string and the state variable for indicating the current state of the state transition process. When the fourth string corresponds to the sub-string and the state value corresponding to the sub-string corresponds to the state variable for indicating the current state, the comparator 4042 outputs a detection signal for indicating that the sub-string corresponding to the current state is detected. Here, the detection signal is divided by the sub-string and the state value corresponding to the sub-string and is then output. Therefore, the encoding circuit 4050 can check which substring is detected and what the state value corresponding to the sub-string based on the detection signal is. Also, when the size of the sub-string to be compared is less than the first string, the comparator 4042 combines the bytes that are "don't care" terms of the corresponding sub-string, updates them to be the same size of the first string, and compares them.

The encoding circuit 4050 encodes the detection signal with the index to output a sub-string index corresponding to the current state and the detected sub-string, and simultaneously outputs a detection signal for indicating that a substring is detected based on the detection signal output by the entries 4040-1, 4040-2, . . . , 4040-M. Here, the numbers of the entries 4040-1, 4040-2, . . . , 4040-M corresponding to the pair of {sub-string, state value} are used for the sub-string index.

Referring to FIG. 11, the path selector 407 selects one of the prefix index output by the prefix processor 404 and the sub-string index output by the sub-string processor 406 based on the state variable for indicating the current state of the state transition process and the detection signals output by the prefix processor 404 and the sub-string processor 406, and then outputs the same.

Assuming that the number of the entries 4010-1, 4010-2, . . . , 4010-P included in the prefix processor 404 is P, the path selector 407 outputs the prefix index when selecting and outputting the corresponding prefix index output by the prefix processor 404. However, when selecting and outputting the sub-string index output by the sub-string processor 406, the path selector 407 adds P to the sub-string index and then outputs the added result.

For example, when the current state is 1, the sub-string "EFGH" is detected by the sub-string processor 406, and 1 is output for the sub-string index, the path selector 407 outputs (P+1) for the index. Also, when the current state is 2, the sub-string "MNQR" is detected by the sub-string processor 406, and 2 is output for the sub-string index, the path selector 407 outputs (P+2) for the index. In addition, P can be expressed with the number of the prefixes extracted from at least one target string.

The state transition processor 408 stores the state value for indicating the next state of the state transition process for each index output by the path selector 407. The state value for indicating the next state will be called the "next state value," and the string ID of the corresponding target string for a specific index is stored together with the next state value. Here, the index for storing the string ID corresponds to the least significant sub-string from among the sub-strings of the target string.

The state transition processor 408 reads the next state value corresponding to the index output by the path selector 407 from among the stored per-index next state value, updates the state variable for indicating the current state with the next state value, and outputs the updated state variable to the offset selector 405, the sub-string processor 406, and the path selector 407

In this instance, when there is a string ID corresponding to the index input by the path selector 407, the state transition processor 408 outputs a detection signal for indicating that the target string is detected, and outputs the corresponding string ID.

An operation of the string matching device 400 will now be described with reference to FIG. 2 and FIG. 14.

It will be assumed that the target string is "ABCDEFGH-MNQR," the size N of the first string is 4, and the input data stream is "XYABCDEFGHMNQROP . . . ."

Hence, the sub-strings "ABCD," "EFGH," and "MNQR" must be sequentially detected so as to detect "ABCDEFGH-MNQR."

Here, "ABCD" corresponds to the prefix.

Therefore, the prefix "ABCD" is stored in the first entry 4010-1 of the prefix processor 404, and the sub-strings "EFGH" and "MNQR" are stored in the sub-string processor 406 together with the corresponding state values.

Also, the strings output by the input buffer 401, the delay buffer 402, and the distributor 403 are shown in FIG. 2.

Further, referring to FIG. 14, the state variable is 0 in the initial state of the state transition process. When the prefix "ABCD" is detected in the state 0, the next state becomes 1. In addition, when the sub-string "EFGH" is detected in the state 1, the next state becomes 2, and when the sub-string "MNQR" is detected in the state 2, the next state becomes 3, and the state 3 indicates that the target string "ABCDEFGHMNQR" is detected.

This process will be described in further detail.

In the first stage, the fourth string "ABCD" corresponding to the offset 2 from among the fourth strings output by the distributor 403 corresponds to the prefix "ABCD" stored in the first entry 4010-1 of the prefix processor 404. Therefore, the third comparator 4012-3 of the first entry 4010-1 outputs a detection signal for indicating that the prefix "ABCD" is detected.

Hence, the encoding circuit 4020 outputs the number, that is, 1, of the first entry 4010-1 for outputting the detection signal as a prefix index. Also, the offset controller 4030 outputs an offset control signal for controlling the offset selector 405 to select the fourth string corresponding to the offset 2 since the fourth string corresponding to the prefix "ABCD" is provided at the offset 2.

Also, since the state variable for indicating the current state is 0 in the first stage and no sub-string is detected by the sub-string processor 406, the path selector 407 selects and outputs the prefix index 1 output by the encoding circuit 4020 of the prefix processor 404. Upon having selected the prefix index output by the prefix processor 404, the path selector 407 outputs the prefix index to the state transition processor 408.

The state transition processor 408 receives the index 1 from the path selector 407, and outputs the next state value 1 corresponding to the index 1 as the state variable.

In the second stage, the offset selector 405 selects the fourth string "EFGH" corresponding to the offset 2 from among the fourth strings output by the distributor 403 and outputs the same based on the offset control signal output by the offset controller 4030 of the prefix processor 404.

Since the state variable output by the state transition processor 408 in the previous stage is 1, the current state becomes 1. Therefore, the sub-string processor 406 recognizes the current state based on the input state variable, checks the sub-string "EFHG" that must be detected in the current state 1, compares it with the fourth string selected and output by the offset selector 405 to check that the two strings correspond with each other, and outputs the entry number 1 corresponding to the state value 1 of the sub-string "EFHG" as a sub-string index.

Hence, since the current state is 1 and no detection signal is output by the prefix processor 404, the path selector 407 selects and outputs the sub-string index output by the sub-string processor 406. In the case of selecting and outputting the sub-string index output by the sub-string processor 406, the path selector 407 adds the number P of the entries included in the prefix processor 404 to the sub-string index and outputs the added result to the state transition processor 408. Therefore, since the current state is 1 and the sub-string "EFGH" is detected by the sub-string processor 406, the path selector 407 outputs the index (P+1) that is generated by adding P to the sub-string index 1.

On receiving the index (P+1), the state transition processor 408 updates the state variable with the next state value 2 corresponding to the index.

In the third stage, the offset selector 405 selects the fourth string "MNQR" corresponding to the offset 2 from among the fourth strings output by the distributor 403, and outputs the same. Since the state variable output by the state transition processor 408 in the previous stage is 2, the current state becomes 2. Therefore, the sub-string processor 406 checks the sub-string "MNQR" that must be detected in the current state 2, compares the same with the fourth string "MNQR" output by the offset selector 405 to check that the two strings correspond with each other, and outputs the entry number corresponding to the state value 2 of the corresponding sub-string "MNQR" as a sub-string index.

Since the current state is 2 and no detection signal is output by the prefix processor 404, the path selector 407 outputs the index (P+2) that is generated by adding P to the sub-string index output by the sub-string processor 406 to the state transition processor 408.

Therefore, the state transition processor 408 checks whether there is a string ID corresponding to the input index (P+2), recognizes that the target string "ABCDEFGHM-NQR" is detected, and outputs the corresponding string ID.

An operation of the string matching device 400 will now be described with reference to FIG. 2, FIG. 15, and FIG. 16.

It will be assumed that the target string includes "ABC-DEFGHMNQR," "EFGHMNOP," and "GHMNQR," the size N of the first string is 4, and the input data stream is "XYAB-CDEFGHMNQROP . . . ". Accordingly, the sub-strings "ABCD," "EFGH," and "MNQR" must be sequentially detected in order to detect "ABCDEFGHMNQR," "EFGH" and "MNOP" must be sequentially detected in order to detect "EFGHMNOP," and "GHMN" and "QR" must be sequentially detected in order to detect "GHMNQR."

Here, "ABCD," "EFGH," and "GHMN" correspond to the prefixes.

As shown in FIG. 16, the prefixes "ABCD," "EFGH," and "GHMN" are respectively stored in the first entry 4010-1, the second entry 4010-2, and the third entry 4010-3 of the prefix processor 404. Also, the sub-strings "EFGH," "MNS," "MNOP," and "QR" are respectively stored in the first entry 4040-1, the second entry 4040-2, the third entry 4040-3, and the fourth entry 4040-4 of the sub-string processor 406. Further, the sub-strings "MNOP" and "MNQR" that can be additionally generated are stored in the fifth entry 4040-5, the sixth entry 4040-6, and the seventh entry 4040-7 of the sub-string processor 406. Also, the state values corresponding to the respective sub-strings are stored together with them.

Here, * denotes the "don't care" term. The "don't care" term represents that the corresponding byte may have any data.

Also, the strings output by the input buffer 401, the delay buffer 402, and the distributor 403 are as shown in FIG. 2.

Further, referring to FIG. 15, the state variable corresponding to the initial state of the state transition process is 0. When the prefix "ABCD" is detected in the state 0, the next state becomes 1, when the sub-string "EFGH" is detected in the state 1, the next state becomes 2, when the sub-string "MNS" is detected in the state 2, the next state becomes 3, and when the state becomes the state 3, the target string "ABCDEFGH-MNS" is recognized to be detected.

Also, when the prefix "GHMN" is detected in the state 0, the next state becomes 6, when the sub-string "QR" is detected in the state 6, the next state becomes 7, when the state becomes the state 7, the target string "GHMNQR" is recognized to be detected, and when the sub-string "MNQR" is detected in the state 2, the next state becomes the state 7. This is because "GHMNQR" is resultantly detected when "MNQR" is detected in the state 2 since the state 2 indicates that "ABCDEFGH" is detected and "ABCDEFGH" includes "GH."

Therefore, as shown in FIG. 16, it is needed to set the state transition process by adding an additional state transition to the state transition process, thereby considering the cases that may happen.

This process will now be described in further detail.

In the first stage, the fourth string "ABCD" corresponding to the offset 2 from among the fourth strings output by the distributor 403 corresponds to the prefix "ABCD" stored in the first entry 4010-1 of the prefix processor 404. Therefore, the third comparator 4012-3 of the first entry 4010-1 outputs a detection signal for indicating that the prefix "ABCD" is detected.

Hence, the encoding circuit 4020 of the prefix processor 404 outputs the index 1 corresponding to the first entry 4010-1 to the prefix index.

Also, since the fourth string corresponding to the prefix "ABCD" is positioned at the offset 2, the offset controller 4030 outputs an offset control signal for the offset selector 405 to select the fourth string corresponding to the offset 2.

Further, since the state variable for indicating the current state is 0 and no sub-string is detected by the sub-string processor 406 in the first stage, the path selector 407 selects and outputs the prefix index 1 output by the encoding circuit 4020 of the prefix processor 404. In the case of selecting the prefix index output by the prefix processor 404, the path selector 407 outputs the same to the state transition processor 408.

The state transition processor 408 receives the index 1 from the path selector 407, and outputs the state value 1 corresponding to the index 1 from among the next state values set for respective indexes as a state variable. As shown in FIG. 16, the state transition processor 408 stores the next state values corresponding for each index output by the path selector 407 in consideration of the state transition process. In this instance, the state transition processor 408 stores the next state values for the respective indexes by dividing the prefix indexes and the indexes corresponding to the sub-string indexes. The state transition processor 408 stores string ID's of target strings corresponding to specific indexes from among the indexes together with the next state values. Here, the specific index represents the index that is output when the sub-strings for the target strings are detected.

In the second stage, the offset selector 405 selects the fourth string "EFGH" corresponding to the offset 2 from among the fourth strings output by the distributor 403 based on the offset control signal output by the offset controller 4030 of the prefix processor 404, and outputs the same.

In the previous stage, since the state variable output by the state transition processor 408 is 1, the current state becomes 1. Therefore, the sub-string processor 406 recognizes the current state based on the input state variable, checks the sub-string "EFHG" to be detected in the current state 1, compares it with the fourth string selected by the offset selector 405 to check that the two strings correspond with each other, and outputs the state value corresponding to the sub-string, that is, the entry number 1 corresponding to the state value 1 of the sub-string "EFGH", as a sub-string index.

"EFGH" positioned at the offset 2 from among the fourth strings output by the distributor 403 corresponds to the prefix "EFGH" of the target string "EFGHMNOP."

Therefore, the prefix processor 404 outputs the prefix index 2 for indicating that the prefix "EFGH" corresponding to the offset 2 is detected. In addition, since the fourth string corresponding to the prefix "EFGH" is positioned at the offset 2, the offset controller 4030 outputs an offset control signal for the offset selector 405 to select the fourth string corresponding to the offset 2.

The path selector 407 selects the sub-string index output by the sub-string processor 406 since the state variable for indicating the current state is 1 when the prefix processor 404 outputs the prefix index, that is, since the state transition for detecting the target string is progressed. In the case of selecting and outputting the sub-string index output by the sub-string processor 406, the path selector 407 adds P to the selected sub-string index and outputs the added result to the state transition processor 408. Therefore, since the current state is 1 and the sub-string "EFGH" is detected by the sub-string processor 406, the path selector 407 outputs the index (P+1) that is the summation of the sub-string index 1 and P.

The state transition processor 408 receives the index (P+1) and updates the state variable with the next state value 2 corresponding to the index.

In the third stage, since the state variable of the previous stage is 1, that is, since state transition for detecting the target string is in progress, the offset selector 405 does not change the offset to be selected but selects the fourth string "MNQR" corresponding to the offset 2 from among the fourth strings output by the distributor 403, and outputs the same. Since the state variable output by the state transition processor 408 in the previous stage is 2, the current state becomes 2. Therefore, the sub-string processor 406 recognizes the current state based on the input state variable, checks the sub-string "MNQR" to be detected in the current state 2, compares it with the fourth string selected by the offset selector 405 to check whether the two strings correspond with each other, and outputs the entry number 6 corresponding to the state value corresponding to the sub-string that is the state value 2 of the sub-string "MNQR" as a sub-string index. Here, the sub-string "MNQR" is stored in the entry 6 and the index 7, and "MNQR" corresponding to the state value 2 is stored in the entry 6, and hence the sub-string processor 406 outputs the sub-string index 6.

"GHMN" that is positioned at the offset 0 from among the fourth strings output by the distributor 403 corresponds to the prefix "GHMN" of the target string "GHMNQR."

Therefore, the prefix processor 404 outputs a prefix index for indicating that the prefix "GHMN" corresponding to the offset 0 is detected. Also, the offset controller 4030 outputs an offset control signal for the offset selector 405 to select the fourth string corresponding to the offset 0 since the fourth string corresponding to the prefix "GHMN" is positioned at the offset 0.

The path selector 407 adds P to the sub-string index output by the sub-string processor 406 and outputs the added result to the state transition processor 408 since the state variable for indicating the current state is 2 when the prefix index is output by the prefix processor 404, that is, since state transition for detecting the target string is progressed. Therefore, since the current state is 2 and the sub-string "MNQR" is detected by the sub-string processor 406, the path selector 407 outputs the index (P+6) which is a summation of the sub-string index 6 and P.

The state transition processor 408 receives the index (P+6), perceives the target string "GHMNQR" is detected by checking whether there is a string ID of the target string corresponding to the index, and outputs the string ID of the corresponding target string.

Figure 17:
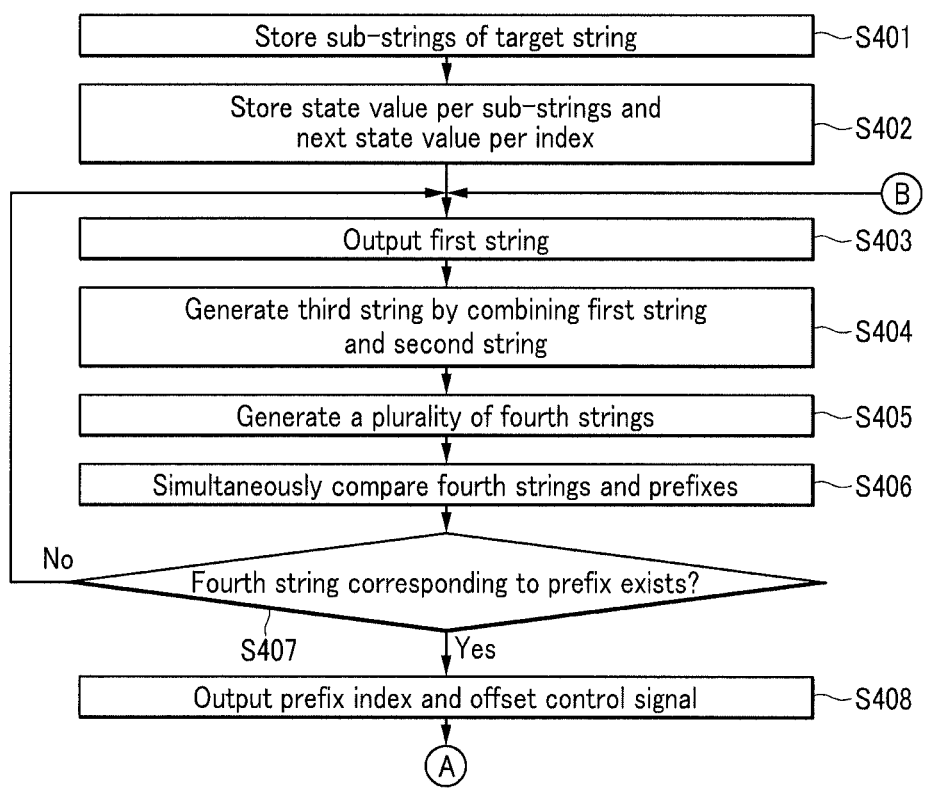
FIG. 17 and FIG. 18 show a flowchart of a string matching method by a string matching device according to a fourth exemplary embodiment of the present invention.
Figure 18:
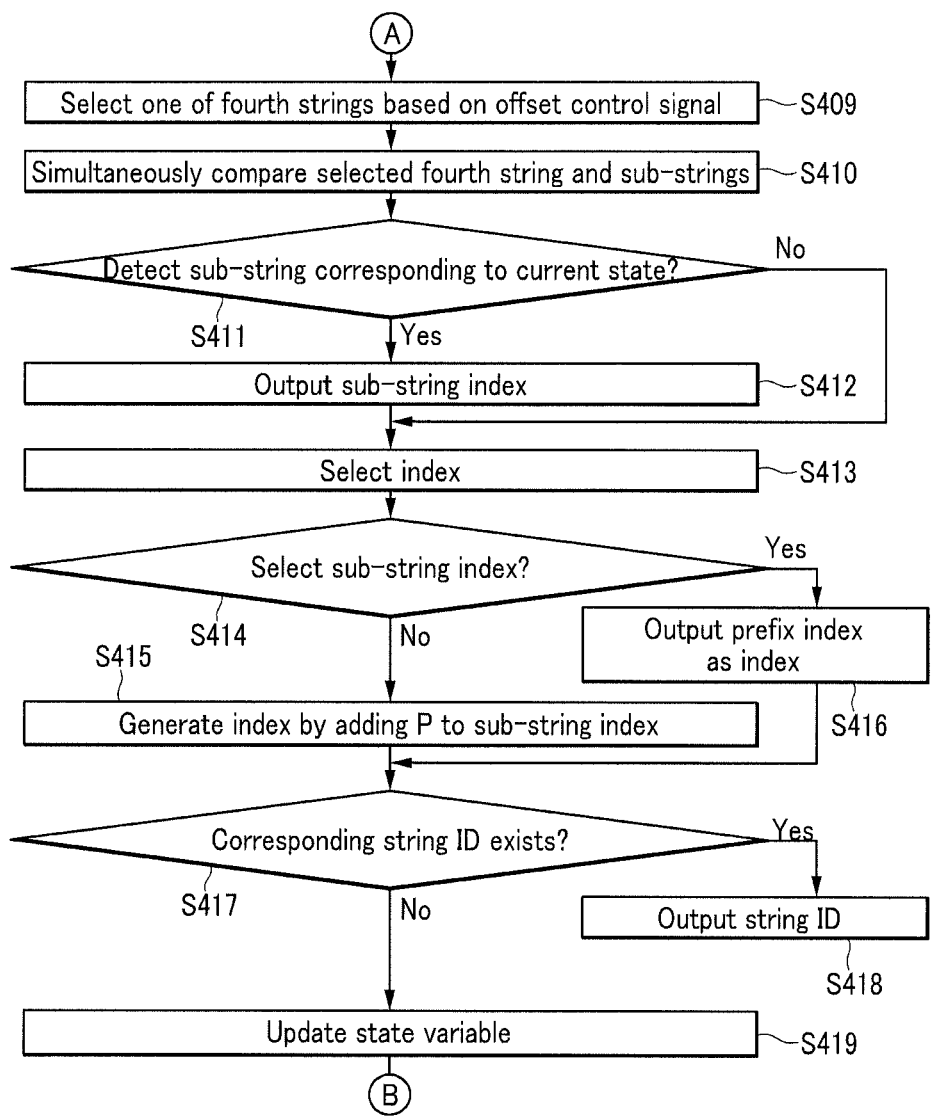

FIG. 17 and FIG. 18 show a flowchart of a string matching method by a string matching device according to a fourth exemplary embodiment of the present invention.

Since the processes S403 to S405 in the string matching method according to the fourth exemplary embodiment of the present invention are performed in a like manner of the processes S102 to S104 in the string matching method according to the first exemplary embodiment, no corresponding detailed description will be provided.

Referring to FIG. 17 and FIG. 18, the string matching device 400 divides at least one target string into at least one sub-string, stores the sub-strings corresponding to the prefix in the prefix processor 404, and stores other sub-strings in the sub-string processor 406 (S401). Here, the size of the sub-string is selected to be less than the size of the first string output by the input buffer 401.

The string matching device 400 stores the state value corresponding to the sub-string of at least one target string in the sub-string processor 406, and stores the next state value corresponding to the index output by the path selector 407 in the state transition processor 408 (S402). Here, when the index corresponds to target string detection, the state transition processor 408 stores the corresponding string ID. In this instance, the next state value for each index is set based on the state transition process corresponding to the string matching method.

When a plurality of fourth strings are generated through the distributor 403, the respective entries 4010-1, 4010-2, ..., 4010-P of the prefix processor 404 simultaneously compare the prefix stored in the corresponding memory 4011 and a plurality of fourth strings by using the comparators 4012-1, 4012-2, ..., 4012-N divided by the offset (S406) to thus check whether a fourth string and a prefix that correspond with each other (S407) exist, and output detection signals for indicating that a corresponding prefix is detected when there are the fourth string and the prefix corresponding with each other. Also, the encoding circuit 4020 of the prefix processor 404 selects one of the detection signals output by the entries 4010-1, 4010-2, ... 4010-P, encodes the selected detection signal with the index, and outputs a prefix index corresponding to the detected prefix. Further, the offset controller 4030 of the prefix processor 404 outputs an offset control signal by using offset information corresponding to the detection signal selected by the encoding circuit 4020 (S408).

Accordingly, the offset selector 405 selects one of the fourth strings output by the distributor 403 and outputs the same based on the offset control signal output by the offset controller 4030 of the prefix processor 404 (S409).

Also, the sub-string processor 406 simultaneously compares the sub-strings stored in the entries 4040-1, 4040-2, ..., 4040-M and the fourth string selected and output by the offset selector 405, and simultaneously compares the state values corresponding to the sub-strings with the state variable for indicating the current state of the state transition process (S410). When a fourth string and a sub-string that correspond with each other exist and the state value corresponding to the sub-string and the state variable for indicating the current state correspond with each other, the sub-string processor 406 determines that the sub-string corresponding to the current state is detected (S411), and outputs a sub-string index for indicating that the sub-string corresponding to the current state is detected (S412).

When the prefix processor 404 or the sub-string processor 406 outputs the prefix index or the sub-string index, the path selector 407 checks the index to be output in the current state based on the state variable for indicating the current state, and selects and outputs one of the prefix index and the sub-string index as an index (S413). Here, the prefix processor 404 outputs the number of the entries 4010-1, 4010-2, ..., 4010-P from which the prefix is detected as prefix indexes. Also, the sub-string processor 406 outputs the number of the entries 4040-1, 4040-2, ..., 4040-P from which the sub-string is detected as a sub-string index.

When the index selected by the path selector 407 is a sub-string index (S414), the path selector 407 adds the number P of the entries included in the prefix processor 404 to the sub-string index, and outputs it as an index (S415). On the contrary, when the index selected by the path selector 407 is a prefix index (S414), the path selector 407 outputs the prefix index as an index (S416).

The state transition processor 408 checks whether the index output by the path selector 407 has a corresponding string ID (S417), and when there exists a corresponding string ID, it recognizes that the target string is detected, and outputs the corresponding string ID (S418). On the contrary, when there is no corresponding string ID, the state transition processor 408 updates the state variable for indicating the current state of the state transition process with the next state value corresponding to the index (S419), and moves to the next stage to repeat the string matching process.

A string matching method and device according to a fifth exemplary embodiment of the present invention will now be described in detail with reference to FIG. 19 to FIG. 22.

Figure 19:
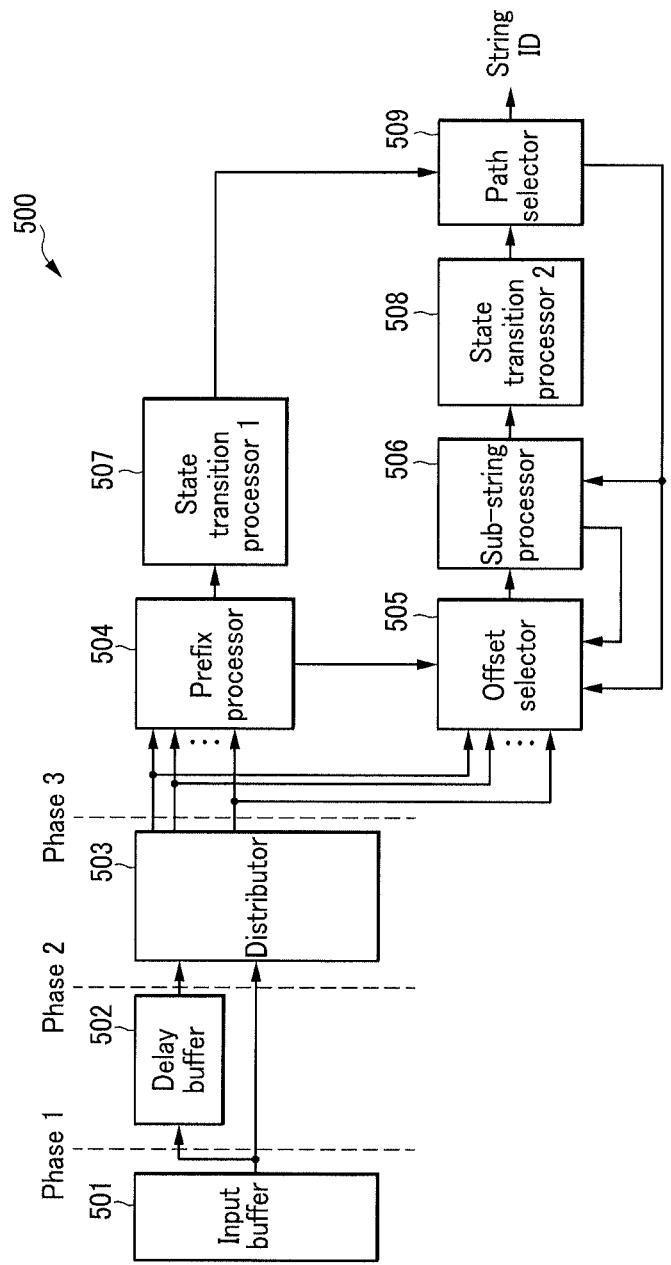
FIG. 19 shows a configuration diagram of a string matching device according to a fifth exemplary embodiment of the present invention.

FIG. 19 shows a configuration diagram of a string matching device according to a fifth exemplary embodiment of the present invention, and FIG. 20 shows an example of data that are stored in respective constituent elements according to a fifth exemplary embodiment of the present invention.

Referring to FIG. 19, the string matching device includes an input buffer 501, a delay buffer 502, a distributor 503, a prefix processor 504, an offset selector 505, a sub-string processor 506, a first state transition processor 507, a second state transition processor 508, and a path selector 509.

The input buffer 501, the delay buffer 502, and the distributor 503 of the string matching device 500 according to the fifth exemplary embodiment of the present invention performs the same functions as the input buffer 101, the delay buffer 102, and the distributor 103 of the string matching device 100 according to the first exemplary embodiment, so detailed descriptions thereof will be omitted.

Also, the prefix processor 504, the offset selector 505, and the sub-string processor 506 perform the same functions as the prefix processor 404, the offset selector 405, and the sub-string processor 406 of the string matching device 400 according to the fourth exemplary embodiment, so no detailed description thereof will be provided.

The first state transition processor 507 stores the next state value for each prefix index output by the prefix processor 504, and stores the same together with the string ID for a specific prefix index. Here, when the target string is configured with the prefix corresponding to the prefix index, the string ID corresponding to the prefix index is stored in the first state transition processor 507.

Also, the first state transition processor 507 outputs the next state value corresponding to the prefix index output by the prefix processor 504, and when a string ID corresponding to the prefix index output by the prefix processor 504 exists, it outputs a detection signal for indicating that the target string is detected, and outputs a corresponding string ID.

The second state transition processor 508 stores the next state values for respective sub-string indexes output by the sub-string processor 506, and stores corresponding string ID's for specific sub-string indexes. Here, when the sub-string corresponding to the sub-string index is the least significant sub-string of the target string, the string ID corresponding to the sub-string index is stored in the second state transition processor 508.

Also, the second state transition processor 508 outputs the next state value corresponding to the sub-string index output by the sub-string processor 506, and when a string ID that corresponds to the sub-string index exists, it outputs a detection signal for indicating that the target string is detected, and outputs the string ID corresponding to the sub-string index.

The path selector 509 selects one of the next state values output by the first state transition processor 507 and the second state transition processor 508 based on the state variable for indicating the current state of the state transition process, updates the state variable for indicating the current state of the state transition process with the selected next state value, selects one of the string ID's output by the first state transition processor 507 and the second state transition processor 508, and outputs the selected string ID. The state variable updated by the path selector 509 is output to the offset selector 505 and the sub-string processor 506.

An operation of the string matching device 500 will now be described with reference to FIG. 2, FIG. 15, and FIG. 20.

It is assumed that the target string is "ABCDEFGHMNQR," "EFGHMNOP," and "GHMNQR," the size N of the first string is 4, and the data stream input to the input buffer 501 is "XYABCDEFGHMNQROP . . . "

Hence, the sub-strings "ABCD," "EFGH," and "MNQR" must be sequentially detected in order to detect "ABCDEFGHMNQR," "EFGH" and "MNOP" must be sequentially detected in order to detect "EFGHMNOP," and "GHMN" and "QR" must be sequentially detected in order to detect "GHMNQR."

Here, "ABCD," "EFGH," and "GHMN" correspond to the prefixes.

Referring to FIG. 20, the first state transition processor 507 stores the next state values for respective prefix indexes output by the prefix processor 504, and stores a predetermined string ID for a specific prefix index.

Further, the second state transition processor 508 stores the next state values for respective sub-string indexes output by the sub-string processor 506, and stores a predetermined string ID for a specific index.

The strings output by the input buffer 501, the delay buffer 502, and the distributor 503 are shown in FIG. 2.

Referring to FIG. 15, the state variable corresponding to the initial state of the state transition process is 0. When the prefix "ABCD" is detected in the state 0, the next state becomes 1, and when the sub-string "EFGH" is detected in the state 1, the next state becomes 2. When the sub-string "MNS" is detected in the state 2, the next state becomes 3, and when the state becomes the state 3, the target string "ABCDEFGHMNS" is recognized as detected.

When the prefix "GHMN" is detected in the state 0, the next state becomes 6, and when the sub-string "QR" is detected in the state 6, the next state becomes 7, and when the state becomes state 7, the target string "GHMNQR" is recognized as detected. When the sub-string "MNQR" is detected in the state 2, the next state becomes the state 7. This is because the state 2 indicates the state in which "ABCDEFGH" is detected and "ABCDEFGH" includes "GH," and "GHMNQR" is resultantly detected when "MNQR" is detected in the state 2. Therefore, as shown in FIG. 20, it is needed to set the state transition process by adding an additional state transition to the state transition process, thereby considering the cases that may happen.

This process will now be described in further detail.

In the first stage, the fourth string "ABCD" corresponding to the offset 2 from among the fourth strings output by the distributor 503 corresponds to the prefix "ABCD" stored in the first entry of the prefix processor 504. The first entry outputs a detection signal for indicating that the prefix "ABCD" is detected.

The prefix processor 504 outputs the index corresponding to the first entry, that is, 1 as a prefix index.

Also, since the fourth string corresponding to the prefix "ABCD" is positioned at the offset 2, the prefix processor 504 outputs an offset control signal for the offset selector 505 to select the fourth string corresponding to the offset 2.

Since the prefix index output by the prefix processor 504 is 1, the first state transition processor 507 outputs the next state value 1 corresponding to the prefix index 1. Since the state variable for indicating the current state of the state transition process is 0 and no sub-string is detected by the sub-string processor 506, the path selector 509 updates the state variable with the next state value 1 output by the first state transition processor 507.

In the second stage, the offset selector 505 selects the fourth string "EFGH" corresponding to the offset 2 from among the fourth strings output by the distributor 503 based on the offset control signal output by the prefix processor 504, and outputs the same.

The current state becomes 1 since the state variable output by the path selector 509 in the previous stage is 1. The sub-string processor 506 recognizes the current state based on the state variable input by the path selector 509, checks the sub-string "EFHG" to be detected in the current state 1, compares it with the fourth string selected by the offset selector 505 to check that the two strings correspond with each other, and outputs the sub-string index 1 corresponding to the state value that corresponds to the sub-string, that is, the state value 1 of the sub-string "EFGH."

Upon receiving the sub-string index 1 from the sub-string processor 506, the second state transition processor 508 outputs the corresponding next state value 2.

"EFGH" that is positioned at the offset 2 from among the fourth strings output by the distributor 503 corresponds to the prefix "EFGH" of the target string "EFGHMNOP."

The prefix processor 504 outputs the prefix index 2 for indicating that the prefix "EFGH" corresponding to the offset 2 is detected. Also, since the fourth string corresponding to the prefix "EFGH" is positioned at the offset 2, the prefix processor 504 outputs an offset control signal for the offset selector 505 to select the fourth string corresponding to the offset 2.

The first state transition processor 507 outputs the next state value 4 corresponding to the prefix index 2 since the prefix index output by the prefix processor 504 is 2.

Also, since the state variable for indicating the current state is 1 when the next state value is output by the first state transition processor 507, that is, since state transition for detecting the target string is in progress, the path selector 509 updates the state variable with the next state value 2 output by the second state transition processor 508.

In the third stage, since the state variable of the previous stage is 1, that is, since state transition for detecting the target string is in progress, the offset selector 505 does not change the offset to be selected, and selects the fourth string "MNQR" corresponding to the offset 2 from among the fourth strings output by the distributor 503 and then outputs the same. Since the state variable updated and output by the path selector 509 in the previous stage is 2, the current state becomes 2.

The sub-string processor 506 recognizes the current state based on the input state variable, checks the sub-string "MNQR" to be detected by the current state 2, compares it with the fourth string selected by the offset selector 505 to check that the two strings correspond with each other, and outputs the sub-string index 6 corresponding to the state value that corresponds to the sub-string, that is, the state value 2 of the sub-string "MNQR."

Here, since "MNQR" corresponding to the state value 2 is stored in the entry 6 while the sub-string "MNQR" is respectively stored in the entry 6 and the entry 7, the sub-string processor 506 outputs the sub-string index 6.

Upon receiving the sub-string index 6 from the sub-string processor 506, the second state transition processor 508 checks that there is a corresponding string ID, recognizes that the target string "GHMNQR" is detected, outputs the string ID 3 of the corresponding target string, and also outputs a detection signal for indicating that the target string is detected.

The path selector 509 recognizes that the target string is detected by the second state transition processor 508 based on the detection signal output by the second state transition processor 508, and finally outputs the string ID that is 3 that is output by the second state transition processor 508.

Figure 21:
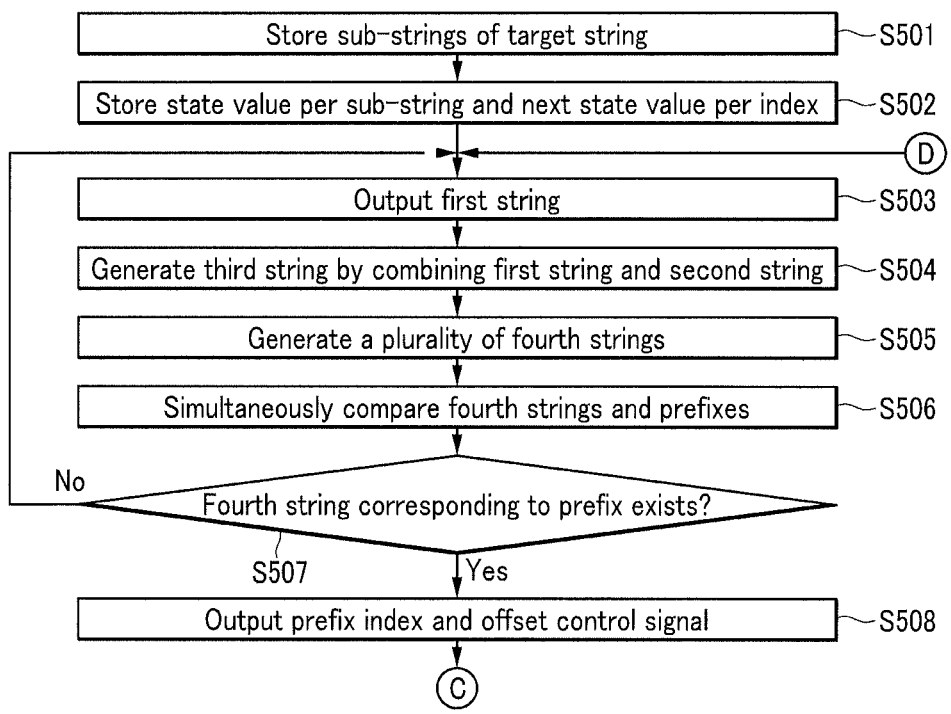
FIG. 21 and FIG. 22 show a flowchart of a string matching method by a string matching device according to a fifth exemplary embodiment of the present invention.
Figure 22:
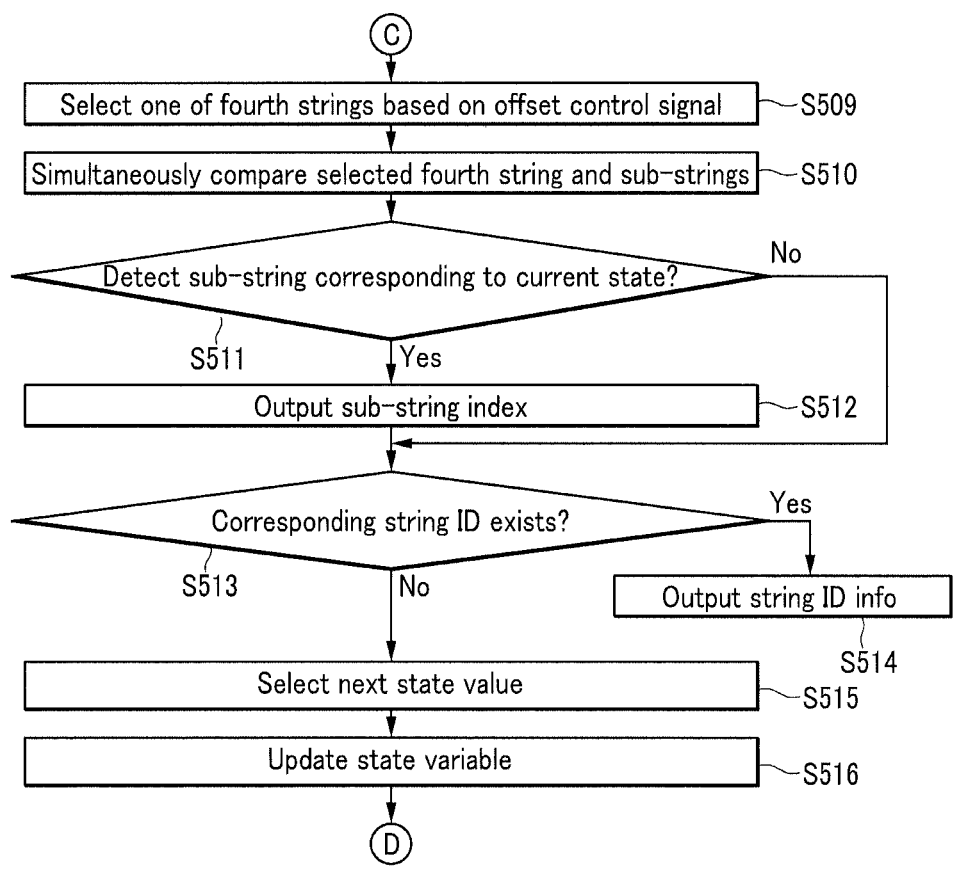

FIG. 21 and FIG. 22 show a flowchart of a string matching method by a string matching device according to a fifth exemplary embodiment of the present invention.

In the string matching method according to the fifth exemplary embodiment of the present invention, the processes S503 to S505 are performed in a like manner of the processes S102 to S104 of the string matching method according to the first exemplary embodiment, so no detailed description thereof will be provided.

Referring to FIG. 21 and FIG. 22, the string matching device 500 divides at least one target string into at least one sub-string, stores the sub-strings corresponding to the prefixes in the prefix processor 504, and stores other sub-strings in the sub-string processor 506 (S501). Here, the sizes of the sub-strings are selected to be less than the size of the first string output by the input buffer 501.

The string matching device 500 stores the state values corresponding to the respective sub-strings of at least one target string in the sub-string processor 50, and stores the next state values corresponding to the respective prefix indexes output by the prefix processor 504 in the first state transition processor 507. Here, when each prefix index corresponds to the target string detection, the first state transition processor 507 stores them together with the corresponding string ID's, and also stores the next state values corresponding to respective sub-string indexes output by the sub-string processor 506 in the second state transition processor 508 (S502). In this instance, when the sub-string index corresponds to the target string detection, the second state transition processor 508 stores them together with the corresponding string ID's. Also, the next state value for respective indexes and the corresponding string ID's are set based on the state transition process corresponding to the string matching method.

When a plurality of fourth strings are generated by the distributor 503, the respective entries (not shown) of the prefix processor 504 simultaneously compare the prefix stored in the corresponding memory (not shown) and a plurality of fourth strings by using comparators (not shown) that are classified by the offset (S506), and when there are a fourth string and a prefix that correspond with each other (S507), the same output detection signals for indicating that the corresponding prefix is detected is output.

An encoding circuit (not shown) of the prefix processor 504 selects one of the detection signals output by the entries (not shown), and outputs an index corresponding to the selected detection signal as a prefix index. An offset controller (not shown) of the prefix processor 504 outputs an offset control signal by using offset information corresponding to the detection signal selected by the encoding circuit (not shown) (S508).

Hence, the offset selector 505 selects and outputs one of the fourth strings output by the distributor 503 based on the offset control signal output by the offset controller (not shown) of the prefix processor 504 (S509). The sub-string processor 506 simultaneously compares the sub-strings stored in the entries (not shown) and the fourth string selected by the offset selector 505, also simultaneously compares the state values corresponding to the sub-strings and the state variable for indicating the current state of the state transition process (S510), and when the fourth string corresponds to the sub-string and the state value corresponding to the sub-string corresponds to the state variable for indicating the current state, it determines that the sub-string corresponding to the current state is detected and outputs the corresponding sub-string index (S511) and (S512).

The first state transition processor 507 checks whether there is a string ID corresponding to the prefix index output by the prefix processor 504 (S513), and when a corresponding string ID exists, it recognizes that the target string is detected and outputs the corresponding string ID (S514), and if not, it outputs the next state value corresponding to the prefix index (S515).

The second state transition processor 508 checks whether there is a string ID corresponding to the sub-string index output by the sub-string processor 506 (S513), and when a corresponding string ID exists, it recognizes that the target string is detected and outputs the corresponding string ID (S514), and if not, it outputs the next state value corresponding to the sub-string index (S515).

Accordingly, the path selector 509 selects one of the string ID's output by the first state transition processor 507 and the second state transition processor 508 and outputs the selected string ID based on the state variable for indicating the current state of the state transition process, selects one of the next state values output by the first state transition processor 507 and the second state transition processor 508, updates the state variable for indicating the current state of the state transition process with the selected next state value (S516), and repeats the string matching process in the next stage.

A string matching method and device according to a sixth exemplary embodiment of the present invention will now be described in detail with reference to FIG. 23 to FIG. 27.

Figure 23:
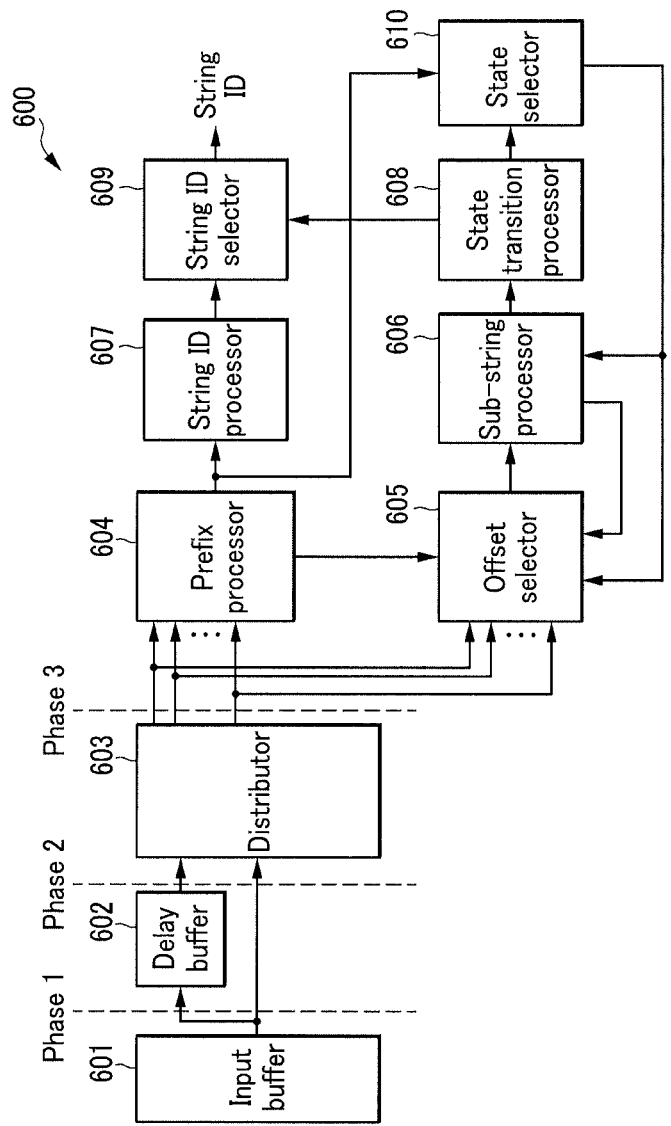
FIG. 23 shows a configuration diagram of a string matching device according to a sixth exemplary embodiment of the present invention.
Figure 24:
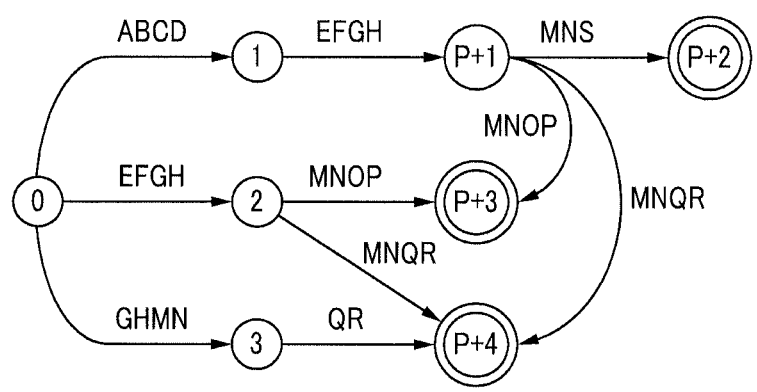
FIG. 24 shows an example of a state transition process according to a sixth exemplary embodiment of the present invention.

FIG. 23 shows a configuration diagram of a string matching device according to a sixth exemplary embodiment of the present invention, FIG. 24 shows an example of a state transition process according to a sixth exemplary embodiment of the present invention, and FIG. 25 shows an example of data that are stored in respective constituent elements according to a sixth exemplary embodiment of the present invention.

Referring to FIG. 23, the string matching device includes an input buffer 601, a delay buffer 602, a distributor 603, a prefix processor 604, an offset selector 605, a sub-string processor 606, a string ID processor 607, a state transition processor 608, a state selector 610, and a string ID selector 609.

The input buffer 601, the delay buffer 602, and the distributor 603 of the string matching device 600 according to the sixth exemplary embodiment of the present invention perform the same functions as the input buffer 101, the delay buffer 102, and the distributor 103 of the string matching device 100 according to the first exemplary embodiment, so no detailed description thereof will be provided.

The prefix processor 604, the offset selector 605, and the sub-string processor 606 perform the same functions as the prefix processor 404, the offset selector 405, and the sub-string processor 406 of the string matching device 400 according to the fourth exemplary embodiment, so no detailed description thereof will be provided.

The string ID processor 607 stores string ID's for specific indexes from among the prefix indexes output by the prefix processor 604, and when there is a string ID corresponding to the prefix index output by the prefix processor 604, it outputs a corresponding string ID and simultaneously outputs a detection signal for indicating that the target string is detected. Here, when the target string is configured with the prefix corresponding to the prefix index, the string ID corresponding to the prefix index is stored in the string ID processor 607.

The state transition processor 608 stores the next state value for respective sub-string indexes output by the sub-string processor 606, and stores the string ID's for specific sub-string indexes. In this instance, when the sub-string corresponding to the sub-string index is the least significant sub-string of the target string, the string ID corresponding to the sub-string index is stored in the state transition processor 608.

Also, the state transition processor 608 outputs the next state value corresponding to the sub-string index output by the sub-string processor 606, and when there is a string ID corresponding to the sub-string index, it outputs a detection signal for indicating that the target string is detected, and outputs a string ID corresponding to the sub-string index.

The state selector 610 selects one of the prefix index output by the prefix processor 604 and the next state value output by the state transition processor 608 based on the state variable for indicating the current state of the state transition process, and updates the state variable for indicating the current state of the state transition process with the selected prefix index or next state value. The state variable output by the state selector 610 is output to the offset selector 605 and the sub-string processor 606.

The string ID selector 609 selects one of the string ID's output by the string ID processor 607 or the state transition processor 608 based on the detection signal output by the string ID processor 607 or the state transition processor 608 and the state variable for indicating the current state of the state transition process, and outputs the selected string ID.

An operation of the string matching device 600 will now be described with reference to FIG. 2, FIG. 24, and FIG. 25.

First, it will be assumed that the target strings are "ABCDEFGHMNQR," "EFGHMNOP," and "GHMNQR," the size N of the first string is 4, the number of entries included in the prefix processor 604 is P, and the data stream input to the input buffer 601 is "XYABCDEFGHMNQROP . . . ".

In order to detect "ABCDEFGHMNQR," "ABCD," "EFGH," and "MNQR" must be sequentially detected, to detect "EFGHMNOP," "EFGH," and "MNOP" must be sequentially detected, and to detect "GHMNQR," "GHMN" and "QR" must be sequentially detected. Here, "ABCD," "EFGH," and "GHMN" correspond to the prefixes.

The strings output by the input buffer 601, the delay buffer 602, and the distributor 603 are shown in FIG. 2.

Referring to FIGS. 24 and 23, when a prefix is detected in the initial state corresponding to the state 0, the number of the corresponding entry from among the entries included in the prefix processor 604 is selected as a prefix index to be used as the state variable.

For example, when the prefix "ABCD" is stored in the first entry of the prefix processor 604 as shown in FIG. 24 and FIG. 25 and the prefix "ABCD" is then detected, the prefix processor 604 outputs the prefix index as 1 corresponding to the first entry, and the same is used as the state variable. In a like manner, when the prefix "EFGH" is stored in the second entry of the prefix processor 604 and the prefix "EFGH" is then detected, the prefix processor 604 outputs the prefix index as 2 corresponding to the second entry, and the same is used as the state variable again.

Referring to FIG. 24, when the prefix index output by the prefix processor 604 is used as the state variable for indicating the state of the state transition process and a sub-string is detected by the sub-string processor 606, the state variable output by the state transition processor 608 becomes greater than (P+1). For example, when the current state is 1 and the sub-string "EFGH" is detected, the state variable output by the state transition processor 608 becomes (P+1), and when the current state is (P+1) and the sub-string "MNS" is detected, the state variable output by the state transition processor 608 becomes (P+2).

The above-noted process will be described in further detail.

In the first stage, the fourth string "ABCD" corresponding to the offset 2 from among the fourth strings output by the distributor 603 corresponds to the prefix "ABCD" stored in the first entry of the prefix processor 604. The prefix processor 604 accordingly outputs a detection signal for indicating that the prefix "ABCD" is detected, and outputs the prefix index 1 of the prefix "ABCD."

Here, the value output as the index of the prefix uses the number of the entry at which the corresponding prefix is detected.

Since the fourth string corresponding to the prefix "ABCD" is positioned at the offset 2, the prefix processor 604 outputs an offset control signal for the offset selector 605 to select the fourth string corresponding to the offset 2.

Since the prefix index 1 is output by the prefix processor 604, the state variable for indicating the current state of the state transition process is 0, and no sub-string is detected by the sub-string processor 606, the state selector 610 updates the state variable of the state transition process with the prefix index 1 output by the prefix processor 604.

Since the prefix index output by the prefix processor 604 is 1 and there is no corresponding string ID, the string ID processor 607 determines that no string is detected, and hence, the output by the string ID processor 607 is useless.

In the second stage, the offset selector 605 selects and outputs the fourth string "EFGH" corresponding to the offset 2 from among the fourth strings output by the distributor 603 based on the offset control signal output by the prefix processor 604.

Since the state variable output by the state selector 610 in the previous stage is 1, the current state becomes 1. The sub-string processor 606 compares the sub-string "EFHG" to be detected in the current state 1 and the fourth string selected by the offset selector 605 to check whether the two strings correspond with each other, and outputs the sub-string index 1 corresponding to the state value of the sub-string, that is, the state value 1 of the sub-string "EFGH."

Upon receiving the sub-string index 1 from the sub-string processor 606, the state transition processor 608 outputs the corresponding next state value (P+1) as a state variable.

"EFGH" positioned at the offset 2 from among the fourth strings output by the distributor 603 corresponds to the prefix "EFGH" of the target string "EFGHMNOP."

The prefix processor 604 outputs the prefix index 2 for indicating that the prefix "EFGH" corresponding to the offset 2 is detected. Since the fourth string corresponding to the prefix "EFGH" is positioned at the offset 2, the prefix processor 604 outputs an offset control signal for the offset selector 605 to select the fourth string corresponding to the offset 2.

Since the state variable for indicating the current state is 1 when the prefix index is output by the prefix processor 604, that is, since state transition for detecting the target string is in progress, the state selector 610 selects the next state value (P+1) output by the state transition processor 608 as the state variable for indicating the current state, and then outputs it.

In the third stage, since the state variable of the previous stage is 1, that is, since state transition for detecting the target string is in progress, the offset selector 605 does not change the offset to be selected, but selects the fourth string "MNQR" corresponding to the offset 2 from among the fourth strings output by the distributor 603 and outputs it. Since the state variable output by the state selector 610 in the previous stage is (P+1), the current state becomes (P+1). The sub-string processor 606 recognizes the current state based on the input state variable, checks the sub-string "MNQR" to be detected in the current state (P+1), compares it with the fourth string selected by the offset selector 605 to check that the two strings correspond with each other, and outputs the sub-string index 6 corresponding to the state value that corresponds to the sub-string, that is, the state value 2 of the sub-string "MNQR."

Here, since the sub-string "MNQR" is stored in the entry 6 and the entry 7 and "MNQR" corresponding to the state value (P+1) is stored in the entry 6, the sub-string processor 606 outputs the sub-string index 6.

The state transition processor 608 checks that the sub-string index 6 input by the sub-string processor 606 has a corresponding string ID to recognize that the target string "GHMNQR" is detected, and outputs the corresponding string ID that is 3. The state transition processor 608 outputs a signal for indicating that the target string is detected.

The string ID selector 609 checks that the target string is detected by checking the detection signal output by the state transition processor 608, and selects and outputs the string ID output by the state transition processor 608.

Figure 26:
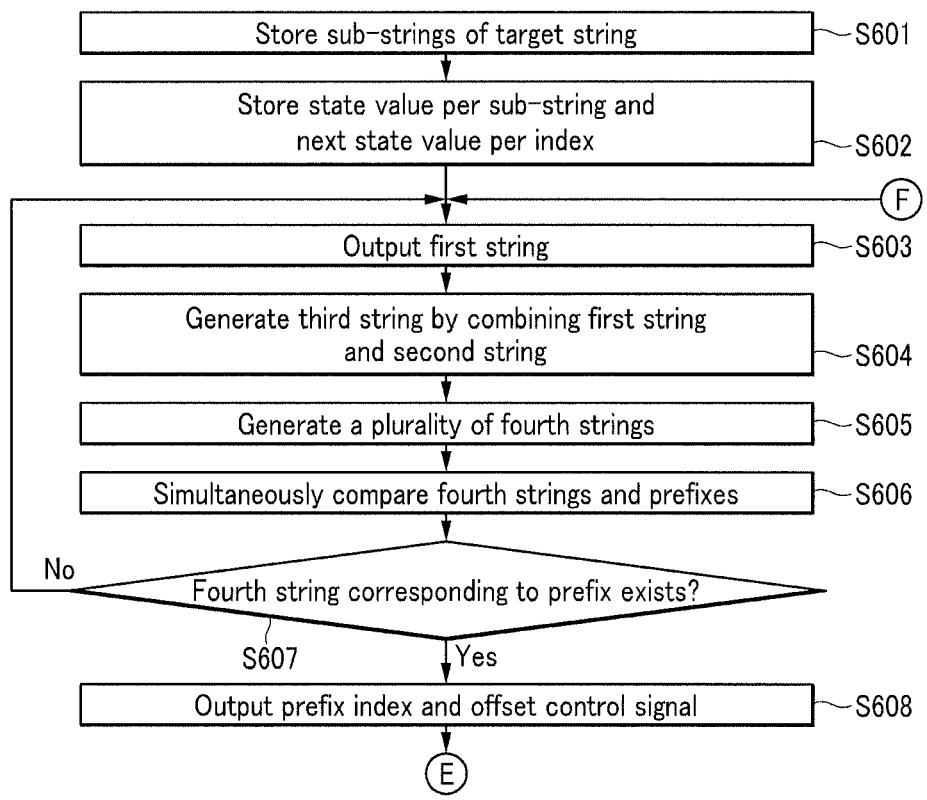
FIG. 26 and FIG. 27 show a flowchart of a string matching method by a string matching device according to a sixth exemplary embodiment of the present invention.
Figure 27:
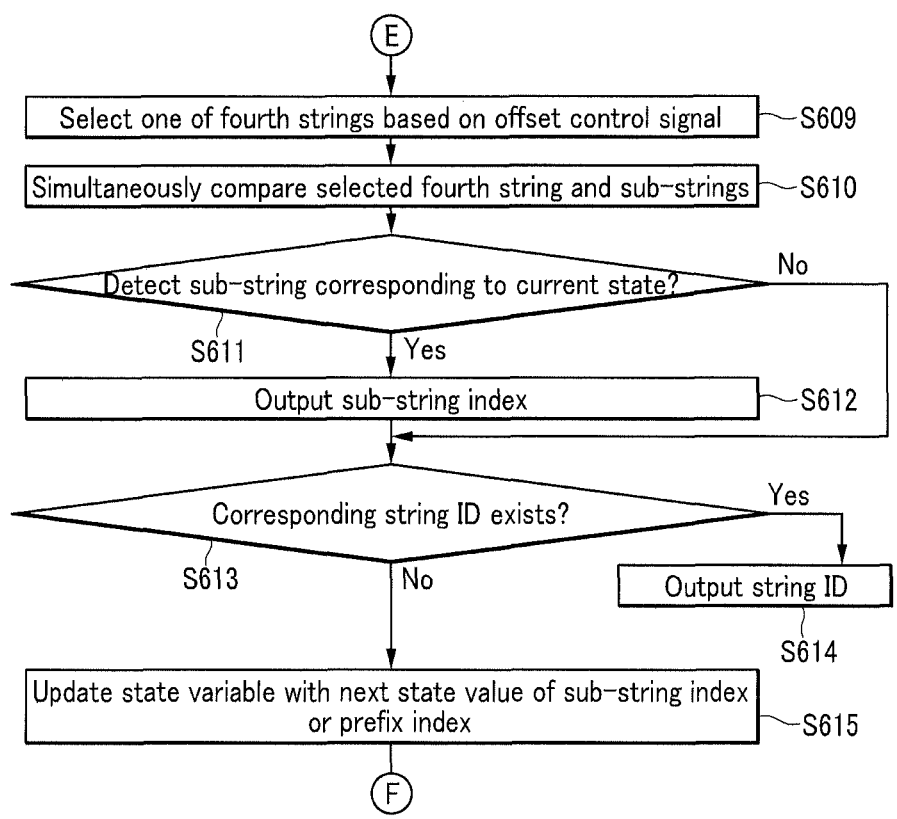

FIG. 26 and FIG. 27 show a flowchart of a string matching method by a string matching device according to a sixth exemplary embodiment of the present invention.

The processes S603 to S605 in the string matching method according to the sixth exemplary embodiment of the present invention are performed in a like manner of the processes S102 to S104 in the string matching method according to the first exemplary embodiment, so no detailed description thereof will be provided.

Referring to FIG. 26 and FIG. 27, the string matching device 600 divides at least one target string into at least one sub-string, stores sub-strings corresponding to the prefixes in the prefix processor 604, and stores other sub-strings in the sub-string processor 606 (S601). Here, the sizes of the respective sub-strings are selected to be less than the size of the first string output by the input buffer 601.

The string matching device 600 stores the state value corresponding to the sub-string of at least one target string in the sub-string processor 606, stores the string ID corresponding to the prefix index output by the prefix processor 604 in the string ID processor 607, and stores the next state value corresponding to the sub-string index output by the sub-string processor 606 in the state transition processor 608 (S602). Here, when the sub-string index corresponds to the target string detection, the state transition processor 608 stores it together with the corresponding string ID. The next state value for each sub-string index and the corresponding string ID are set based on the state transition process corresponding to the string matching method.

When a plurality of fourth strings are generated by the distributor 603, respective entries (not shown) of the prefix processor 604 simultaneously compare the prefix stored in a memory (not shown) and the fourth strings by using comparators (not shown) that are classified by the offset (S606), and when there are a prefix and a fourth string that correspond with each other, they output a detection signal for indicating that the corresponding prefix is detected (S607 and S608).

An encoding circuit (not shown) of the prefix processor 604 selects one of the detection signals output by the entries (not shown), and outputs the corresponding prefix index based on the selected detection signal. An offset controller (not shown) of the prefix processor 604 outputs an offset control signal by using offset information corresponding to the detection signal selected by the encoding circuit (not shown) (S608).

Accordingly, the offset selector 605 selects and outputs one of the fourth strings output by the distributor 603 based on the offset control signal output by the offset controller (not shown) of the prefix processor 604 (S609). The sub-string processor 606 simultaneously compares the sub-string stored in the entries (not shown) and the fourth string selected by the offset selector 605, and simultaneously compares the state values corresponding to the sub-strings with the state variable for indicating the current state of the state transition process (S610), and when there are a fourth string and a sub-string that correspond with each other and the state value corresponding to the corresponding sub-string corresponds to the state variable for indicating the current state, it output a sub-string index for indicating that the sub-string corresponding to the current state is detected (S611) and (S612).

The string ID processor 607 checks whether there is a string ID corresponding to the prefix index output by the prefix processor 604 (S613), and when the corresponding string ID is found, it recognizes that the target string is detected and outputs the corresponding string ID.

The state transition processor 608 checks whether there is a string ID corresponding to sub-string index output by the sub-string processor 606 (S613), and when the corresponding string ID is found, it recognizes that the target string is detected and outputs the corresponding string ID, and when there is no corresponding string ID, it outputs the next state value corresponding to the sub-string index.

The string ID selector 609 selects one of the string ID's output by the string ID processor 607 or the state transition processor 608 based on the detection signal output by the string ID processor 607 or the state transition processor 608 and the state variable for indicating the current state of the state transition process, and outputs the selected string ID (S614).

The state selector 610 selects one of the prefix index output by the prefix processor 604 and the next state value output by the state transition processor 608 based on the state variable for indicating the current state of the state transition process, updates the state variable for indicating the current state of the state transition process with the selected prefix index or the next state value (S615), and goes to the next state to repeat the string matching process.

According to the exemplary embodiments of the present invention, it is possible to efficiently perform a string matching process on a high-speed data stream.

The above-described embodiments can be realized through a program for realizing functions corresponding to the configuration of the embodiments or a recording medium for recording the program in addition to through the above-described device and/or method, which is easily realized by a person skilled in the art.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A string matching method by a string matching device comprising:
   dividing each of a plurality of target strings into at least one sub-string;
   dividing a prefix that is a most significant sub-string from the at least one sub-string and dividing other sub-strings excluding the prefix from the at least one sub-string for each respective target strings;
   setting a state value of each prefix and the other sub-strings;
   setting a next state value of each prefix based on the order of the prefix and the state value, and the other sub-strings based on the order of the other sub-strings and the state value;
   extracting a plurality of strings with different start positions from an input data stream;
   detecting a sub-string corresponding to at least one string from among the plurality of strings based on a state variable;
   updating the state variable with one next state value corresponding to the detected sub-string from among the next state values of the at least one sub-string; and
   detecting one of the target strings based on the state variable and the detected sub-string.

2. The string matching method of claim 1, wherein the detecting one of the target strings includes repeating the detecting of a sub-string and the updating while changing the plurality of strings from the data stream; and
   detecting one of the target strings when the sub-string detected through the repeating is the least significant sub-string of the corresponding target string.

3. The string matching method of claim 2, further comprising:
   allocating a string ID corresponding to the least significant sub-string for each of the plurality of target strings; and
   detecting the one target string when there is a string ID corresponding to the detected sub-string.

4. The string matching method of claim 3, further comprising:
   allocating a first index to the prefix for each of the plurality of target strings;
   allocating a second index to each of the other sub-strings; and
   generating a third index by using the index selected from the first index and the second index, and wherein the setting of a next state value includes setting the next state value corresponding to the third index.

5. The string matching method of claim 4, wherein allocating of the string ID includes allocating the corresponding string ID when the third index is the least significant sub-string of one of the plurality of target strings.

6. The string matching method of claim 5, wherein the detecting of one of the target strings when the sub-string detected through the repeating is the least significant sub-string of the corresponding target string includes determining the detected sub-string as the least significant sub-string when there is a string ID allocated to the third index corresponding to the detected sub-string.

7. The string matching method of claim 4, wherein the string matching device includes a plurality of entries corresponding to the plurality of prefixes for the plurality of target strings, and the generating of a third index includes:
   when the selected index is the first index, generating the third index by using the first index; and
   when the selected index is the second index, generating the third index by adding the number of the entries to the second index.

8. The string matching method of claim 3, wherein the setting of a next state value includes:
   setting the next state value of the prefix for each of the plurality of target strings; and
   setting the next state value of each of the other sub-strings for each of the plurality of target strings.

9. The string matching method of claim 8, wherein detecting of a sub-string corresponding to the at least one string includes:
   detecting the prefix corresponding to the at least one string; and
   detecting a sub-string corresponding to the at least one string from among the other sub-strings, and the updating includes selecting the one next state value from among the next state value of the detected prefix and the next state values of the other detected sub-strings.

10. The string matching method of claim 3, further comprising:
    allocating a first index to the prefix for each of the plurality of target strings;
    allocating a second index to each of the other sub-strings for each of the plurality of target strings; and
    allocating a next state value to the second index of each of the other sub-strings.

11. The string matching method of claim 10, wherein the detecting of a sub-string corresponding to the at least one string includes:
    detecting the prefix corresponding to the at least one string; and
    detecting a sub-string corresponding to the at least one string from among the other sub-strings, and the updating includes selecting the one next state value from among the first index of the detected prefix and the next state values of the other detected sub-strings.

12. The string matching method of claim 11, wherein the detecting of one of the target strings when the sub-string detected through the repeating is the least significant sub-string of the corresponding target string includes determining the sub-string that is detected when there is a string ID corresponding to the first index of the detected prefix or the second index of the other detected sub-strings as the least significant sub-string.

13. The string matching method of claim 12, wherein the allocating of a string ID includes allocating the string ID corresponding to an index having the least significant substring as the corresponding sub-string from among the first index of the prefixes for the plurality of target strings and the second index of the other sub-strings for the plurality of target strings.

14. The string matching method of claim 3, wherein the detecting of a sub-string corresponding to the at least one string includes:
   detecting a prefix corresponding to at least one of the plurality of strings from among the prefixes for the plurality of target strings;
   selecting one of the plurality of strings based on a control signal; and
   detecting a sub-string corresponding to the selected string from among the other sub-strings.

15. The string matching method of claim 14, wherein the method further includes determining whether to change the control signal based on the result of detecting the corresponding prefix and the result of detecting a sub-string corresponding to the selected string, and the repeating further includes the determining.

16. The string matching method of claim 15, wherein the determining of whether to change the control signal includes changing the control signal when the corresponding prefix is detected and no sub-string corresponding to the selected sub-string is detected.

17. The string matching method of claim 15, wherein the control signal instructs offset of the selected string.

18. The string matching method of claim 17, wherein the offset corresponds to a start position of the selected string from among the plurality of strings.

19. The string matching method of claim 15, wherein the detecting of a sub-string corresponding to the selected string from among the other sub-strings includes combining a sub-string having a size that is less than the plurality of strings from among the other sub-strings with a don't care term to update it to have the same size as the plurality of strings.

20. The string matching method of claim 1, wherein the extracting includes:
   storing a string stream generated by arranging the input data stream with a predetermined size;
   sequentially reading the first string from the stored string stream;
   generating a third string by combining the first string and a second string before the first string; and
   extracting the plurality of strings with different start positions from the third string, wherein the plurality of strings are changed while changing the first string.

21. The string matching method of claim 20, wherein the sizes of the plurality of strings correspond to the first string.

22. The string matching method of claim 21, wherein the size of the sub-string is less than or equal to that of the first string.

* * * * *